United States Patent
Neumeier et al.

(10) Patent No.: US 12,468,755 B2
(45) Date of Patent: *Nov. 11, 2025

(54) SYSTEM AND METHOD FOR IMPROVING WORK LOAD MANAGEMENT IN ACR TELEVISION MONITORING SYSTEM

(71) Applicant: INSCAPE DATA, INC., Irvine, CA (US)

(72) Inventors: Zeev Neumeier, Berkeley, CA (US); Michael Collette, San Rafael, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,599

(22) Filed: Sep. 22, 2023

(65) Prior Publication Data
US 2024/0184820 A1    Jun. 6, 2024

Related U.S. Application Data

(63) Continuation of application No. 17/157,143, filed on Jan. 25, 2021, now Pat. No. 12,321,377, which is a continuation of application No. 15/211,508, filed on Jul. 15, 2016, now Pat. No. 10,949,458.

(60) Provisional application No. 62/193,345, filed on Jul. 16, 2015.

(51) Int. Cl.
*G06F 16/48*     (2019.01)
*H04N 21/234*    (2011.01)
*H04N 21/44*     (2011.01)
*H04N 21/81*     (2011.01)

(52) U.S. Cl.
CPC ....... *G06F 16/48* (2019.01); *H04N 21/23418* (2013.01); *H04N 21/44008* (2013.01); *H04N 21/8126* (2013.01)

(58) Field of Classification Search
CPC ........................................................ G06F 16/48
See application file for complete search history.

(56) References Cited

U.S. PATENT DOCUMENTS

| | | | | |
|---|---|---|---|---|
| 6,081,774 A * | 6/2000 | de Hita | ............... | G06F 16/3338 707/E17.058 |
| 6,990,453 B2 * | 1/2006 | Wang | ................... | G10L 17/26 704/E15.045 |
| 7,346,512 B2 * | 3/2008 | Li-Chun Wang | ..... | G06F 16/634 704/E15.045 |
| 7,474,769 B1 * | 1/2009 | McAfee, II | ........ | G06V 40/1365 726/19 |
| 7,860,852 B2 * | 12/2010 | Brunner | ............... | G06F 16/951 707/706 |
| 8,887,048 B2 * | 11/2014 | Nordhagen | ......... | G06F 16/4393 715/726 |

(Continued)

*Primary Examiner* — Mark E Hershley
(74) *Attorney, Agent, or Firm* — POLSINELLI LLP

(57) ABSTRACT

Resource utilization of an automated content recognition (ACR) system can be optimized by delaying the identification of certain large quantities of media cue data. The delayed identification of the media may be for the purpose of, for example, generating usage statistics or other non-time critical work flow, among other non-real-time uses. In addition, real-time identification of a certain subset of media cue data is performed for the purposes of video program substitution, interactive television opportunities or other time-specific events.

17 Claims, 15 Drawing Sheets

(56) References Cited

U.S. PATENT DOCUMENTS

| | | | |
|---|---|---|---|
| 8,930,980 B2* | 1/2015 | Neumeier | H04N 21/44008 |
| | | | 725/19 |
| 9,668,030 B2* | 5/2017 | Gupta | H04N 21/812 |
| 10,290,053 B2* | 5/2019 | Priess | G06Q 50/265 |
| 2002/0032698 A1* | 3/2002 | Cox | G06F 16/41 |
| | | | 715/209 |
| 2006/0277047 A1* | 12/2006 | DeBusk | G10L 19/018 |
| | | | 704/E11.002 |
| 2007/0041667 A1* | 2/2007 | Cox | G06F 16/433 |
| | | | 382/190 |
| 2007/0242880 A1* | 10/2007 | Stebbings | H04N 21/2541 |
| | | | 382/172 |
| 2008/0013829 A1* | 1/2008 | Stebbings | G06F 16/70 |
| | | | 382/172 |
| 2008/0060036 A1* | 3/2008 | Cox | G06F 16/5838 |
| | | | 725/110 |
| 2010/0111377 A1* | 5/2010 | Monroe | G07C 9/38 |
| | | | 382/118 |
| 2010/0306805 A1* | 12/2010 | Neumeier | H04N 21/8126 |
| | | | 725/60 |
| 2012/0095958 A1* | 4/2012 | Pereira | G06F 16/435 |
| | | | 707/609 |
| 2012/0117584 A1* | 5/2012 | Gordon | H04N 21/8358 |
| | | | 725/19 |
| 2012/0201361 A1* | 8/2012 | Angel | H04M 3/42221 |
| | | | 379/88.01 |
| 2013/0217332 A1* | 8/2013 | Altman | G06Q 20/3224 |
| | | | 455/3.01 |
| 2014/0282673 A1* | 9/2014 | Neumeier | H04N 21/8126 |
| | | | 725/19 |
| 2017/0109760 A1* | 4/2017 | Cumberland | G06Q 30/0201 |
| 2019/0205474 A1* | 7/2019 | Pawar | G06F 40/205 |

* cited by examiner

SYSTEM AND METHOD FOR IMPROVING WORK LOAD MANAGEMENT IN ACR TELEVISION MONITORING SYSTEM

CROSS-REFERENCES TO RELATED APPLICATIONS

This application is a continuation of U.S. patent application Ser. No. 17/157,143 filed Jan. 25, 2021, which is a continuation of U.S. patent application Ser. No. 15/211,508, filed Jul. 15, 2016, which claims the benefit of U.S. Provisional Patent Application No. 62/193,345, filed Jul. 16, 2015, the disclosures of which are herein incorporated by reference in their entireties for all purposes.

This application is related to U.S. patent application Ser. No. 14/551,933, filed Nov. 24, 2014, which is a continuation of U.S. patent application Ser. No. 14/089,003, filed Nov. 25, 2013, now U.S. Pat. No. 8,898,714, which is a continuation of U.S. patent application Ser. No. 12/788,721, filed May 27, 2010, now U.S. Pat. No. 8,595,781 B2, which claims the benefit of U.S. Provisional Patent Application No. 61/182,334, filed May 29, 2009, and U.S. Provisional Patent Application No. 61/290,714, filed Dec. 29, 2009, the disclosures of which are herein incorporated by reference in their entireties for all purposes.

FIELD

The present disclosure relates to improving management of system resources used for recognition of content displayed by a media system (e.g., a television system, a computer system, or other electronic device capable of connecting to the Internet). Further, the present disclosure relates to effectively and efficiently identifying content. For example, various techniques and systems are provided for improving work load management in an automated content recognition (ACR) television monitoring system.

BACKGROUND OF THE INVENTION

Advancements in fiber optic and digital transmission technology have enabled the television industry to rapidly increase channel capacity and provide some degree of interactive television (ITV) services due in large part to the industry combining the increased data capacity of each channel with the processing power of a computer in the form of a Smart TV and/or set-top box (STB) or other device.

The technology of ITV has been developed in an attempt to enable TV systems to serve as a two-way information distribution mechanism in a manner approximating aspects of the World Wide Web. Features of an ITV accommodate a variety of marketing, entertainment, and educational capabilities such as allowing a user to order an advertised product or service, compete against contestants in a game show, and the like. In many instances, the interactive functionality is controlled by a STB which executes an interactive program written for the TV broadcast. The interactive functionality is often displayed on the TV's screen and may include icons or menus to allow a user to make selections via the TV's remote control or a keyboard.

SUMMARY OF THE INVENTION

In accordance with one technique, interactive content can be incorporated into the broadcast stream (also referred to herein as the "channel/network feed"). The term "broadcast stream" may refer to the broadcast signal received by a television, regardless of the method of transmission of that signal, e.g., by antenna, satellite, cable, or any other method of signal transmission. One method of transparently incorporating interactive content into a broadcast stream is the insertion of one or more "triggers" into the broadcast stream for a particular program. Program content in which said triggers have been inserted is sometimes referred to as enhanced program content or as an enhanced TV program or video signal. Triggers may be used to alert a STB or the processor in a Smart TV that interactive content is available. The trigger may contain information about available content as well as the memory location of the content. A trigger may also contain user-perceptible text that is displayed on the screen, for example, at the bottom of the screen, which may prompt the user to perform some action or choose from a plurality of options.

Connected TVs are TVs that are connected to the Internet via the viewer's home network (wired or wireless). Connected TVs can run an application platform such as Google's Android, or other proprietary platforms, enabling interactive, smartphone or tablet-like applications to run on said TVs. The basic common features of such connected TV platforms are: (1) a connection to the Internet; and (2) the ability to run software applications with graphics from said applications overlaid on, or occupying all of, the TV display.

Currently, few TVs (connected or otherwise) have access to metadata about what the viewer is watching at the moment, nor who the viewer is from the perspective of providing that viewer with programing or commercial opportunities customized for them. While some information on a content offering is available in bits and pieces in the content distribution pipeline, by the time a show reaches the screen over legacy distribution systems, all information other than video and audio has been lost.

Attempts are being made to encode such identification information in entertainment and commercial content in the form of watermarks on the audio or video portions in a way that can survive compression and decompression, but such techniques are not yet universally available. Even once those codes are standardized, readily available and reliable, they are not forecast to have the ability to identify the exact point in the program that is being displayed on a certain TV system to within a fraction of a second resolution.

As a result, in legacy TV signal distribution systems, the TV set does not "know" what channel or show the viewer is watching at the present moment, nor what the show is about. The channel and show information seen on screen by a viewer is currently grafted on the STB from sometimes incomplete information. This barrier is the result of the fundamental structure of the TV content distribution industry.

The related applications cited herein relate to a system and method for identifying the content currently being viewed at close to real time, and can thus identify at what point certain contextually relevant additional information, advertising, or interactive opportunities might be available to the programming provider. In addition to such real-time applications, these applications teach a system and method that can generate statistics about viewing patterns with precision and granularity not previously available. However, while replacing advertising modules or offering a viewer additional program or commercial offering opportunities needs to be done in near real-time, identifying certain programing and generating viewing and usage statistics for a specific channel's programming or the system-inserted replacement programming is not as time sensitive.

Thus, it is the object of embodiments of the invention to maximize the efficiency of system resource utilization by automatically executing less time critical functions during off-peak periods. Embodiments of the invention generally relate to systems and methods for identifying video segments displayed on a screen of a television system, and to systems and methods for providing contextually targeted content to television systems based on such video segment identification. As used herein, the term "media systems" includes, but it not limited to, television systems, audio systems, and the like. As used herein, the term "television systems" includes, but is not limited to, televisions such as web TVs and connected TVs (also known as "Smart TVs") and equipment incorporated in, or co-located with said television, such as a set-top box (STB), a digital video disc (DVD) player or a digital video recorder (DVR). As used herein, the term "television signals" includes signals representing video and audio data which are broadcast together (with or without metadata) to provide the picture and sound components of a television program or commercial. As used herein, the term "metadata" means data about or relating to the video/audio data in television signals.

Embodiments of the present invention are directed to systems and methods for identifying which video segment is being displayed on a screen of a television system. In particular, the resulting data identifying the video segment being currently viewed can be used to enable the capture and appropriately respond to a TV viewer's reaction (such as requesting that the programming be restarted from its beginning) or to trigger the provision of relevant content provider and advertiser supplied information or tightly targeted commercial messages, thus enabling the seamless switching of a viewer from a conventional, real-time broadcast environment delivered over the cable system's network to a custom-configured, video on demand (VoD) product delivered over an Internet connection.

In accordance with some embodiments, the video segment is identified by sampling at intervals (e.g., 100 milliseconds) a subset of the pixel data being displayed on the screen (or associated audio data) and then finding similar pixel (or audio) data in a content database. In accordance with some embodiments, the video segment is identified by extracting audio or image data associated with such video segment and then finding similar audio or image data in a content database. In accordance with some embodiments, the video segment is identified by processing the audio data associated with such video segment using known automated speech recognition techniques. In accordance with some embodiments, the video segment is identified by processing metadata associated with such video segment. As used herein, "cues" or "content identifiers" may correspond to pixel data, audio data, image data, metadata, or a sample or subset thereof Embodiments of the invention are further directed to systems and methods for providing contextually targeted content to an interactive television system. The contextual targeting is based on not only identification of the video segment being displayed, but also a determination concerning the playing time or offset time of the particular portion of the video segment being currently displayed. The terms "playing time" and "offset time" will be used interchangeably herein to refer to a time which is offset from a fixed point in time, such as the starting time of a particular television program or commercial.

More specifically, embodiments of the invention comprise technology that can detect what is playing on a connected TV, deduce the subject matter of what is being played, and interact with the viewer accordingly. In particular, embodiments disclosed herein overcome the limited ability of interactive TVs to strictly pull functionality from a server via the Internet, thereby enabling novel business models including the ability to provide instant access to VoD versions of content, and to provide the user with the option to view higher resolutions or 3D formats of the content if available, with the additional ability to start over, fast forward, pause and rewind. Embodiments of the invention also enable having some or all advertising messages included in the now VoD programing, customized, by way of example only and without limitation, with respect to the viewer's location, demographic group, or shopping history, or to have the commercials reduced in number or length or eliminated altogether to support certain business models.

In accordance with some embodiments, the video segment is identified and the offset time is determined by sampling a subset of the pixel data (or associated audio data) being displayed on the screen and then finding similar pixel (or audio) data in a content database. In accordance with some embodiments, the video segment is identified and the offset time is determined by extracting audio or image data associated with such video segment and then finding similar audio or image data in a content database. In accordance with some embodiments, the video segment is identified and the offset time is determined by processing the audio data associated with such video segment using known automated speech recognition techniques. In accordance with some embodiments, the video segment is identified and the offset time is determined by processing metadata associated with such video segment.

As will be described in more detail herein, the system for identifying video segments being viewed on a connected TV and, optionally, determining offset times, can reside on the television system of which the connected TV is a component. In accordance with some embodiments, one part of the system for identifying video segments resides on the television system and another part resides on a server connected to the television system via the Internet.

In some embodiments of the invention, the system can schedule the non-real-time testing of accumulated media cues for processing at more economically advantageous times such as non-prime hours when other processing workloads are relatively light. Since the results of said testing are typically to generate usage data statistics and are, as such, not as time dependent as is the processing required to trigger a contextually related event on the client TV.

According to some embodiments of the invention, a method is provided. The method comprises receiving a plurality of known media content. The plurality of known media content has associated known content identifiers (also referred to herein as "cues"). The method further comprises storing the known content identifiers associated with the plurality of known media content in a non-real-time database. The method further comprises determining a subset of the plurality of known media content having associated contextually-related data. The method further comprises storing the known content identifiers associated with the subset of the plurality of known media content having associated contextually-related data in a real-time database. The method further comprises receiving unknown content identifiers corresponding to unknown media content being displayed by a media system. The method further comprises determining whether the unknown content identifiers correspond to known content identifiers associated with the subset of the plurality of known media content in the real-time database. The method further comprises selecting known media content associated with the corresponding known content identifiers from the real-time database and identifying the unknown media content as the selected known media content, when the unknown content identifiers correspond to known content identifiers in the real-time database. The method further comprises selecting known media content associated with known content identifiers from the non-real-time database corresponding to the unknown content identifiers and identifying the unknown media content as the selected known media content, when the unknown content identifiers do not correspond to known content identifiers in the real-time database.

In some embodiments, the method further comprises retrieving the contextually-related data associated with the selected known media content and facilitating display on the media system of the contextually-related data, when the unknown content identifiers correspond to known content identifiers in the real-time database. In some embodiments, the method further comprises calculating statistics using the selected known media content, when the unknown content identifiers do not correspond to known content identifiers in the real-time database. In some embodiments, the unknown content identifiers comprise at least one of a sample of pixel data or a sample of audio data of the unknown media content being displayed by the media system. In some embodiments, the method further comprises determining an offset time associated with the unknown media content using the unknown content identifiers and the known content identifiers associated with the selected known media content.

In some embodiments, the method is implemented on one or more processors and one or more non-transitory machine-readable storage media comprised in the media system. In some embodiments, the method is implemented on one or more processors and one or more non-transitory machine-readable storage media comprised in a server located remotely from the media system. In some embodiments, the steps of determining whether the unknown content identifiers correspond to known content identifiers associated with the subset of the plurality of known media content in the real-time database, selecting known media content associated with the corresponding known content identifiers from the real-time database and identifying the unknown media content as the selected known media content, when the unknown content identifiers correspond to known content identifiers in the real-time database, are performed in real-time. In some embodiments, the steps of selecting known media content associated with known content identifiers from the non-real-time database corresponding to the unknown content identifiers and identifying the unknown media content as the selected known media content, when the unknown content identifiers do not correspond to known content identifiers in the real-time database, are performed in non-real-time.

According to some embodiments of the invention, a system is provided. The system includes one or more processors. The system further includes a non-transitory machine-readable storage medium containing instructions which when executed on the one or more processors, cause the one or more processors to perform operations including the steps of the above methods.

According to some embodiments of the invention, a computer program product tangibly embodied in a non-transitory machine-readable storage medium of a computing device may be provided. The computer program product may include instructions configured to cause one or more data processors to perform the steps recited in the above methods.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures, in which like reference numerals represent like components or parts throughout the several drawings.

DETAILED DESCRIPTION OF THE INVENTION

Figure 1:
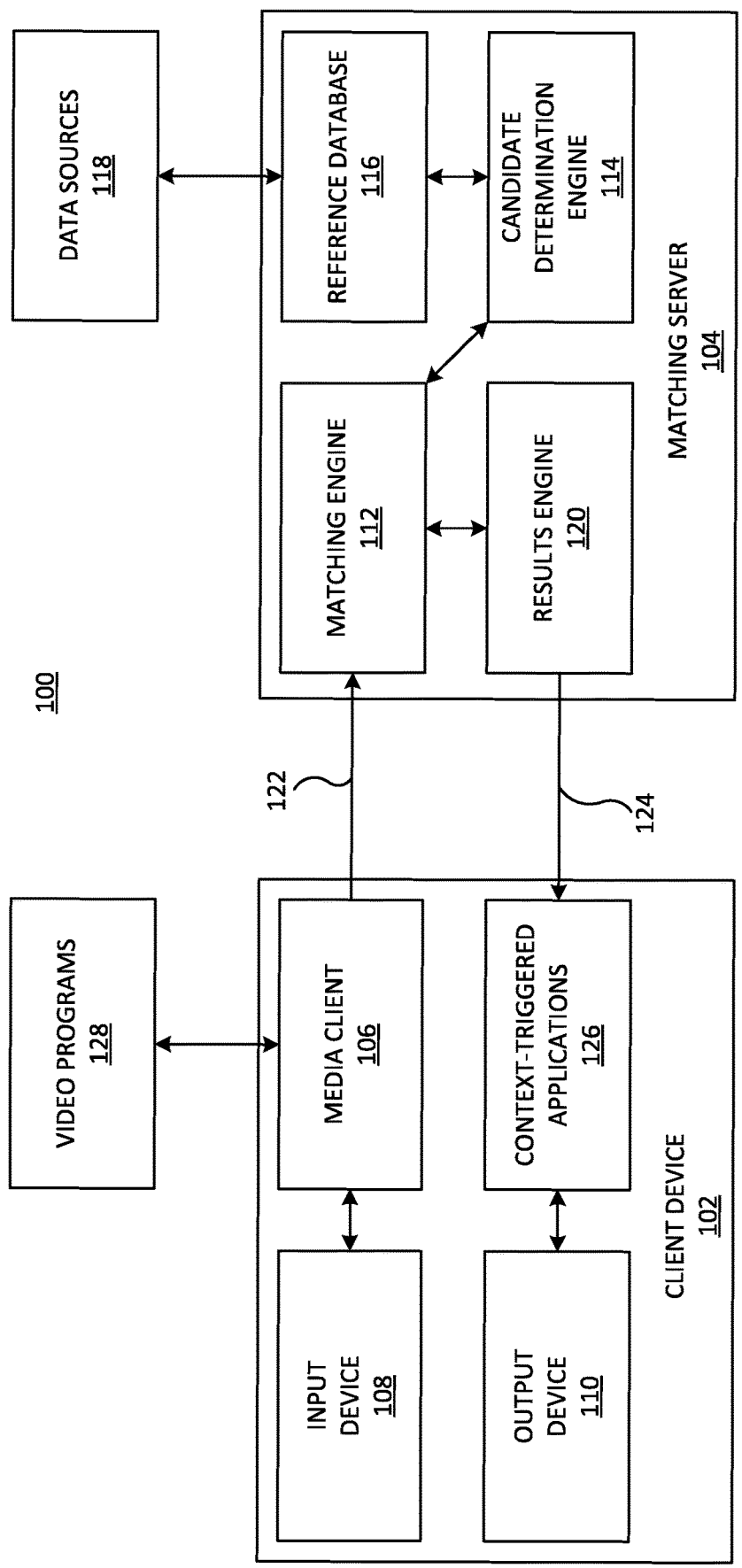
FIG. 1 is a block diagram of an example of a matching system for identifying media content being displayed by a media system according to embodiments of the invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Systems and methods described herein may relate to the technical approaches disclosed in several related applications including U.S. Pat. Nos. 8,595,781, 8,769,584, U.S. Pat. App. Pub. No. 2010/0306805, U.S. Pat. App. Pub. No. 2014/0082663, U.S. Pat. App. Pub. No. 2014/0201769, and U.S. Pat. No. 8,595,781, incorporated by reference herein in their entireties.

Exemplary embodiments disclosed herein teach a system and method that extends the meaning of the previously used term "contextually targeted" beyond the display of simple graphics or short video segments related to the associated content, to the complete substitution of substantially enhanced forms of the selected content, replacing it in its entirety with a VoD like format, enabling the viewer to re-start the content from its beginning, with complete "virtual DVR" control including restarting, pausing, "fast forward", and "rewind" functions, along with the ability to view the content at higher resolution or in 3D, if available, and the ability to remove commercial messages and replace them with messages more tightly targeting the viewer by location, demographics, or previous shopping behavior based on such information being stored in the form of compact data modules of the type often called "cookies" in the memory of a connected TV viewing system such as a Smart TV. This enables the development and sale to sponsors or brokers of various premium, closely-targeted advertising products, or in an alternative business model, the removal of some or all of the advertising messaging as a premium service for the viewer.

FIG. 1 illustrates a matching system 100 that can identify unknown content. In some examples, the unknown content can include one or more unknown data points. In such examples, the matching system 100 can match unknown data points with reference data points to identify unknown video segments associated with the unknown data points. The reference data points can be included in a reference database 116.

The matching system 100 includes a client device 102 and a matching server 104. The client device 102 includes a media client 106, an input device 108, an output device 110, and one or more contextual applications 126. The media client 106 (which can include a television system, a computer system, or other electronic device capable of connecting to the Internet) can decode data (e.g., broadcast signals, data packets, or other frame data) associated with video programs 128. The media client 106 can place the decoded contents of each frame of the video into a video frame buffer in preparation for display or for further processing of pixel information of the video frames. The client device 102 can be any electronic decoding system that can receive and decode a video signal. The client device 102 can receive video programs 128 and store video information in a video buffer (not shown). The client device 102 can process the video buffer information and produce unknown data points (which can referred to as "cues"), described in more detail below with respect to FIG. 3. The media client 106 can transmit the unknown data points to the matching server 104 for comparison with reference data points in the reference database 116.

The input device 108 can include any suitable device that allows a request or other information to be input to the media client 106. For example, the input device 108 can include a keyboard, a mouse, a voice-recognition input device, a wireless interface for receiving wireless input from a wireless device (e.g., from a remote controller, a mobile device, or other suitable wireless device), or any other suitable input device. The output device 110 can include any suitable device that can present or otherwise output information, such as a display, a wireless interface for transmitting a wireless output to a wireless device (e.g., to a mobile device or other suitable wireless device), a printer, or other suitable output device.

The matching system 100 can begin a process of identifying a video segment by first collecting data samples from known video data sources 118. For example, the matching server 104 collects data to build and maintain a reference database 116 from a variety of video data sources 118. The video data sources 118 can include media providers of television programs, movies, or any other suitable video source. Video data from the video data sources 118 can be provided as over-the-air broadcasts, as cable TV channels, as streaming sources from the Internet, and from any other video data source. In some examples, the matching server 104 can process the received video from the video data sources 118 to generate and collect reference video data points in the reference database 116, as described below. In some examples, video programs from video data sources 118 can be processed by a reference video program ingest system (not shown), which can produce the reference video data points and send them to the reference database 116 for storage. The reference data points can be used as described above to determine information that is then used to analyze unknown data points.

The matching server 104 can store reference video data points for each video program received for a period of time (e.g., a number of days, a number of weeks, a number of months, or any other suitable period of time) in the reference database 116. The matching server 104 can build and continuously or periodically update the reference database 116 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, reducing the number of actual reference data point sets is advantageous in reducing the storage load of the matching server 104.

The media client 106 can send a communication 122 to a matching engine 112 of the matching server 104. The communication 122 can include a request for the matching engine 112 to identify unknown content. For example, the unknown content can include one or more unknown data points and the reference database 116 can include a plurality of reference data points. The matching engine 112 can identify the unknown content by matching the unknown data points to reference data in the reference database 116. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the video data sources 118. For example, data points can be extracted from the information provided from the video data sources 118 and can be indexed and stored in the reference database 116.

The matching engine 112 can send a request to the candidate determination engine 114 to determine candidate data points from the reference database 116. A candidate data point can be a reference data point that is a certain determined distance from the unknown data point. In some examples, a distance between a reference data point and an unknown data point can be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point can be the certain determined distance from an unknown data point when the pixels at each sample location are within a particular pixel value range.

In one illustrative example, a pixel value of a pixel can include a red value, a green value, and a blue value (in a red-green-blue (RGB) color space). In such an example, a first pixel (or value representing a first group of pixels) can be compared to a second pixel (or value representing a second group of pixels) by comparing the corresponding red values, green values, and blue values respectively, and ensuring that the values are within a certain value range (e.g., within 0-5 values). For example, the first pixel can be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. The candidate determination engine 114 can return the candidate data points to the matching engine 112.

For a candidate data point, the matching engine 112 can add a token into a bin that is associated with the candidate data point and that is assigned to an identified video segment from which the candidate data point is derived. A corresponding token can be added to all bins that correspond to identified candidate data points. As more unknown data points (corresponding to the unknown content being viewed) are received by the matching server 104 from the client device 102, a similar candidate data point determination process can be performed, and tokens can be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the unknown video content segment being viewed will have more tokens assigned to it than other bins for segments that are not being watched. For example, as more unknown data points are received, a larger number of reference data points that correspond to the bin are identified as candidate data points, leading to more tokens being added to the bin. Once a bin includes a particular number of tokens, the matching engine 112 can determine that the video segment associated with the bin is currently being displayed on the client device 102. A video segment can include an entire video program or a portion of the video program. For example, a video segment can be a video program, a scene of a video program, one or more frames of a video program, or any other portion of a video program.

Figure 2:
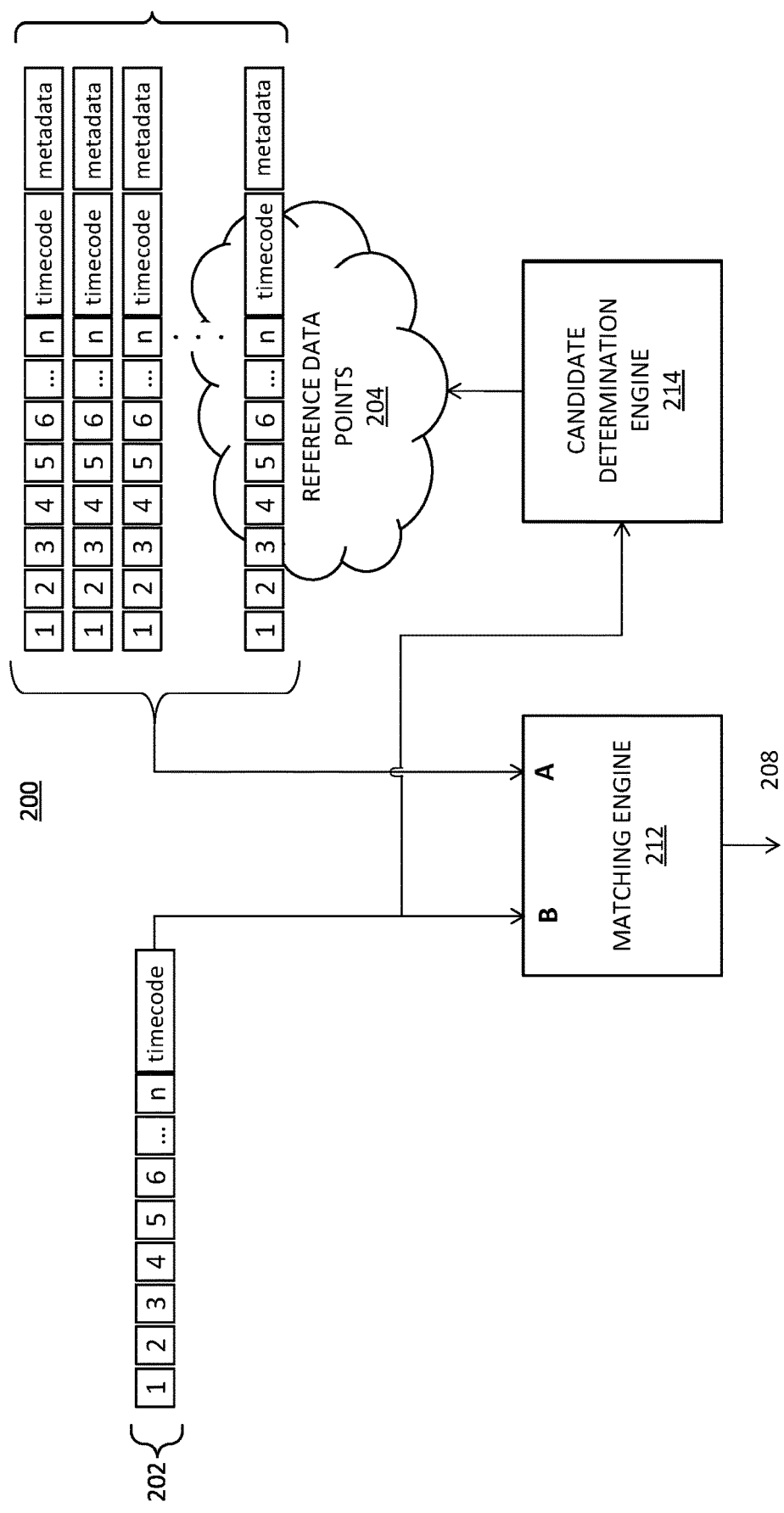
FIG. 2 is an example of a matching system identifying unknown data point according to embodiments of the invention.

FIG. 2 illustrates components of a matching system 200 for identifying unknown data. For example, the matching engine 212 can perform a matching process for identifying unknown content (e.g., unknown media segments, a search query, an image of a face or a pattern, or the like) using a database of known content (e.g., known media segments, information stored in a database for searching against, known faces or patterns, or the like). For example, the matching engine 212 receives unknown data content 202 (which can be referred to as a "cue") to be matched with a reference data point of the reference data points 204 in a reference database. The unknown data content 202 can also be received by the candidate determination engine 214, or sent to the candidate determination engine 214 from the matching engine 212. The candidate determination engine 214 can conduct a search process to identify candidate data points 206 by searching the reference data points 204 in the reference database. In one example, the search process can include a nearest neighbor search process to produce a set of neighboring values (that are a certain distance from the unknown values of the unknown data content 202). The candidate data points 206 are input to the matching engine 212 for conducting the matching process to generate a matching result 208. Depending on the application, the matching result 208 can include video data being presented by a display, a search result, a determined face using facial recognition, a determined pattern using pattern recognition, or any other result.

In determining candidate data points 206 for an unknown data point (e.g., unknown data content 202), the candidate determination engine 214 determines a distance between the unknown data point and the reference data points 204 in the reference database. The reference data points that are a certain distance from the unknown data point are identified as the candidate data points 206. In some examples, a distance between a reference data point and an unknown data point can be determined by comparing one or more pixels of the reference data point with one or more pixels of the unknown data point, as described above with respect to FIG. 1. In some examples, a reference data point can be the certain distance from an unknown data point when the pixels at each sample location are within a particular value range. As described above, a candidate data point is a reference data point that is an approximate match to the unknown data point, and because of the approximate matching, multiple candidate data points (related to different media segments) are identified for the unknown data point. The candidate determination engine 114 can return the candidate data points to the matching engine 112.

Figure 3:
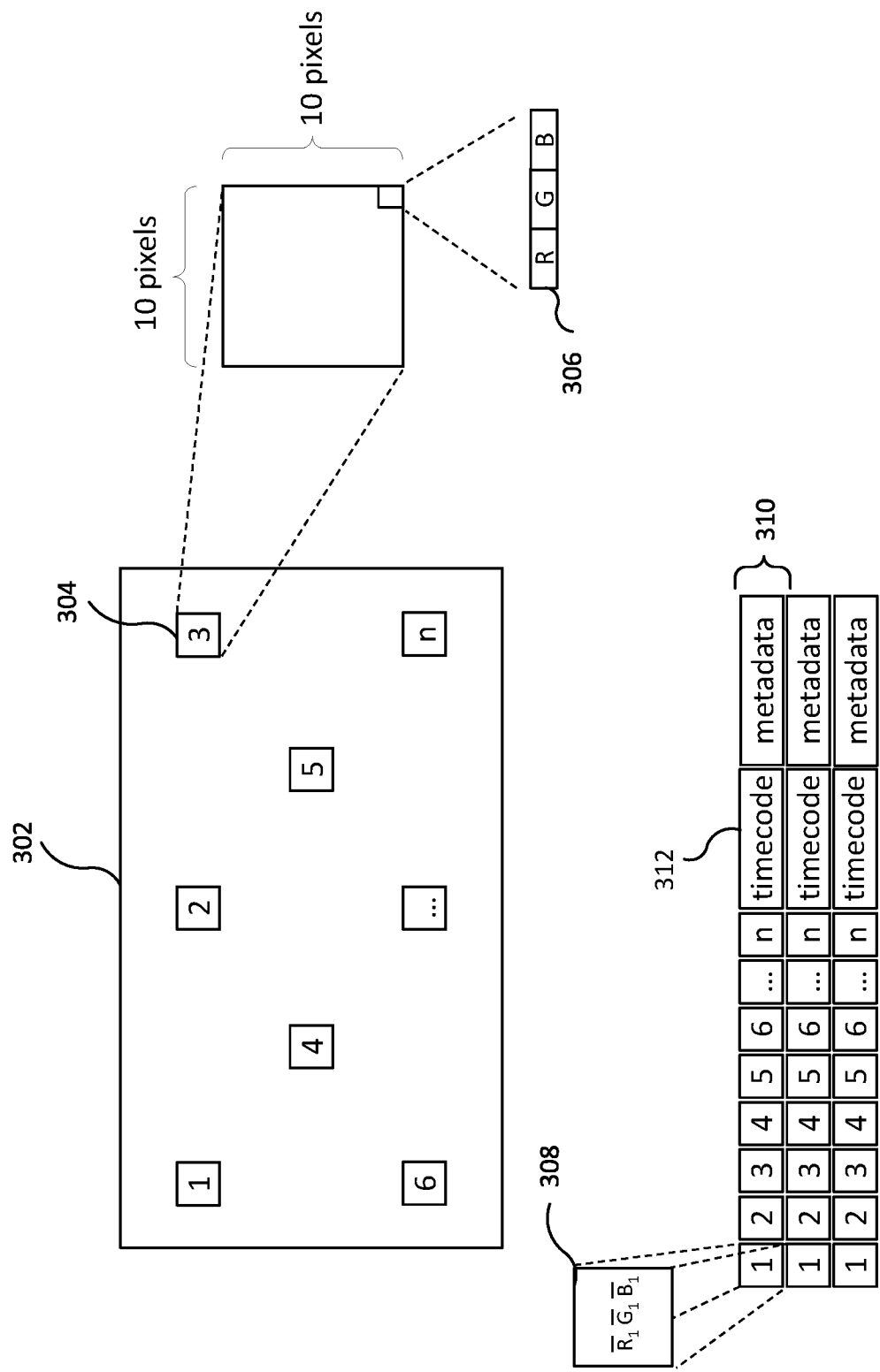
FIG. 3 is a block diagram of an example of a media capture system according to embodiments of the invention.

FIG. 3 illustrates an example of a video ingest capture system 400 including a memory buffer 302 of a decoder. The decoder can be part of the matching server 104 or the media client 106. The decoder may not operate with or require a physical television display panel or device. The decoder can decode and, when required, decrypt a digital video program into an uncompressed bitmap representation of a television program. For purposes of building a reference database of reference video data (e.g., reference database 316), the matching server 104 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 304) is shown in FIG. 3. As noted above, a pixel patch can include an array of pixels, such as a 10×10 array. For example, the pixel patch 304 includes a 10×10 array of pixels. A pixel can include color values, such as a red, a green, and a blue value. For example, a pixel 306 is shown having Red-Green-Blue (RGB) color values. The color values for a pixel can be represented by an eight-bit binary value for each color. Other suitable color values that can be used to represent colors of a pixel include luma and chroma (Y, Cb, Cr) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 304 is calculated, and is shown by pixel patch mean 308. In one illustrative example, the time code can include an "epoch time," which representing the total elapsed time (in fractions of a second) since midnight, Jan. 1, 1970. For example, the pixel patch mean 308 values are assembled with a time code 412. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue"). The data point 310 is one example of a reference video data point.

Figure 4:
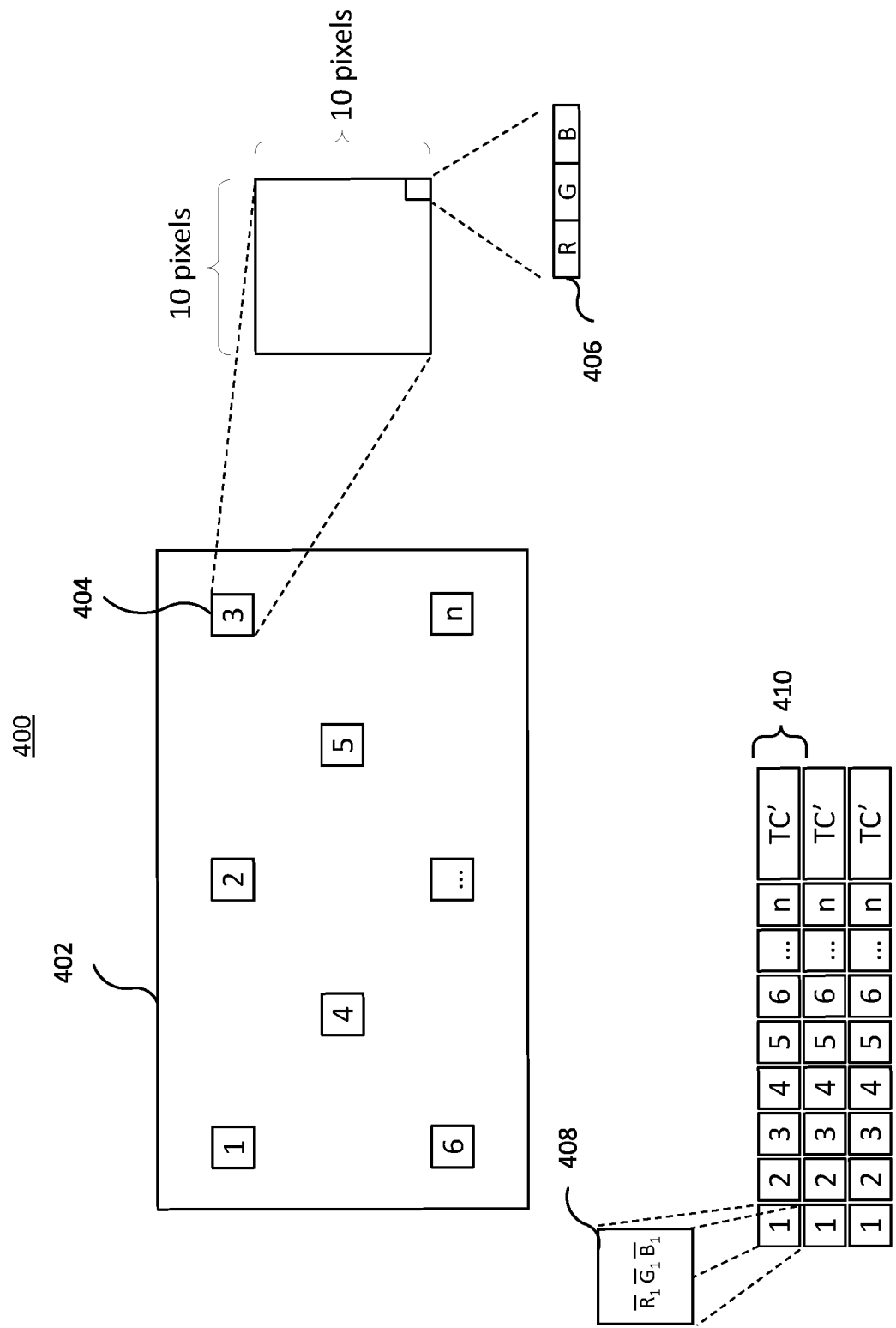
FIG. 4 is a block diagram of an example of a system for collecting media content presented by a display according to embodiments of the invention.

A process of identifying unknown video segments begins with steps similar to creating the reference database. For example, FIG. 4 illustrates a video ingest capture system 400 including a memory buffer 402 of a decoder. The video ingest capture system 400 can be part of the client device 102 that processes data presented by a display (e.g., on an Internet-connected television monitor, such as a smart TV, a mobile device, or other television viewing device). The video ingest capture system 400 can utilize a similar process to generate unknown video data point 410 as that used by system 300 for creating reference video data point 310. In one example, the media client 106 can transmit the unknown video data point 410 to the matching engine 112 to identify a video segment associated with the unknown video data point 410 by the matching server 104.

As shown in FIG. 4, a video patch 404 can include a 10×10 array of pixels. The video patch 404 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 410) is formed from the mean pixel values and the current time is appended to the data. One or more unknown video data points can be sent to the matching server 104 to be matched with data from the reference database 116 using the techniques described above.

Figure 5:
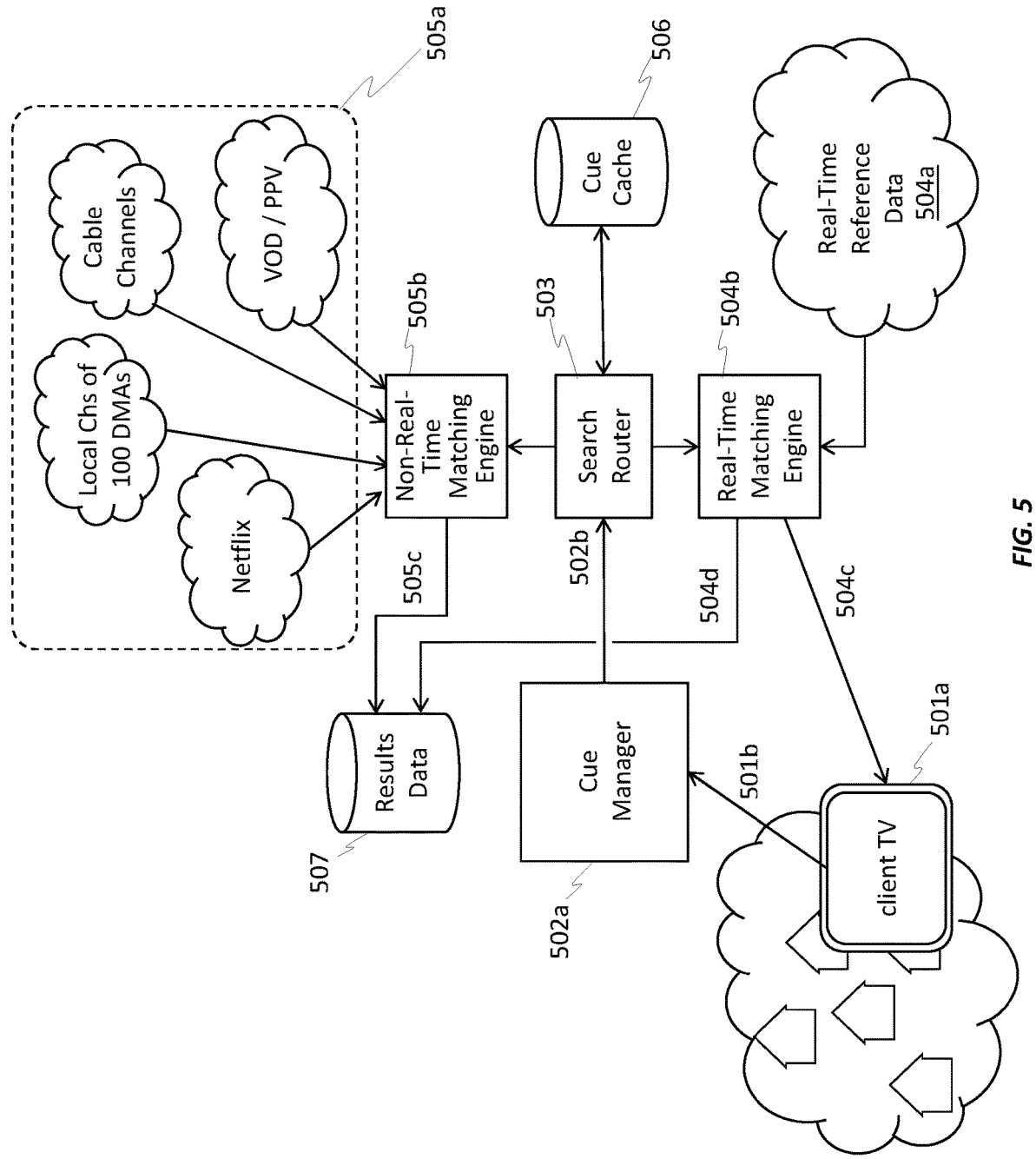
FIG. 5 is a block diagram of an example of a system for improving work load management in ACR media monitoring systems according to embodiments of the invention.

FIG. 5 is a block diagram of an example of a system for improving work load management in ACR media monitoring systems according to embodiments of the invention. Client television system 501a sends unknown media cues 501b (also referred to herein as "unknown content identifiers") corresponding to unknown media content being displayed by client television system 501a to cue manager 502a. Cue manager 502a receives the unknown media cues 501b, and forwards the unknown media cues 502b to search router 503. Search router 503 routes the unknown media cues 502b to real-time matching engine 504b and/or non-real-time matching engine 505b. For example, search router 503 may immediately route the unknown media cues 502b to real-time matching engine 504b for immediate identification, and/or may store a copy of unknown media cues 502b in cue cache 506 to provide to non-real-time matching engine 505b at a later time. The unknown media cues 502b may be retrieved from cue cache 506 and provided to non-real-time matching engine 505b at a more convenient or efficient time, such as overnight, as real-time identification is not needed.

Each of real-time matching engine 504b and non-real-time matching engine 505b have their own reference database of known media content cues (also referred to herein as "known content identifiers"). Real-time matching engine 504b searches real-time reference data 504a for the unknown media cues 502b in real-time, upon receipt of unknown media cues 502b from search router 503. Real-time reference data 504a contains known media content cues associated with known media content having contextually-related data, such as any additional data to be provided to client television system 501a relevant to the media content being displayed. Thus, real-time reference data 504a may be a far smaller database that non-real-time reference data 505a. It is important that identification of media content having contextually-related data be done in real-time, such that the contextually-related data can be provided to client television system 501a while the media content is being displayed. Exemplary contextually-related data includes informative content, interactive content, advertising content, textual content, graphical content, audio content, video content, and/or the like. Real-time matching engine 504a may support viewer-specific, interactive, and contextual content overlay or substitution services that typically only have a fraction of a second to trigger (i.e., the contextually-related data must be provided in real-time).

If the unknown media cues 502b are identified as matching known media cues associated with known media content within real-time reference data 504a, the contextually-related data corresponding to the known media content may be retrieved from real-time reference data 504a and provided at 504c to client television system 501a. In some embodiments, client television system 501a can then display the contextually-related data. Such contextually-related data might include, by way of example only, replacement of a commercial message with one more directed to the specific viewer based on the media content being viewed, additional information regarding the media content being viewed, or an opportunity to interact with the media content itself or other viewers who may also be watching it. In addition, if the unknown media cues 502b are identified as matching known media cues associated with known media content within real-time reference data 504a, an identification of the matching known media content 504d may be stored in results data 507.

Non-real-time matching engine 505b searches non-real-time reference data 505a for the unknown media cues 502b in non-real-time, for example, at a more convenient, efficient and/or economically advantageous time as determined by search router 503. For example, non-real-time matching engine 505b may perform searching during non-prime hours when other system processing workloads are comparatively light. Non-real-time reference data 505a may contain known media content cues associated with known media content not having contextually-related data. In other words, it is not important that identification of media content not having contextually-related data be done in real-time, because no data needs to be provided to client television system 501a while the media content is being displayed.

However, it may still be important to identify the unknown media content for other purposes, such as to calculate hourly or daily statistics regarding how many television systems are displaying particular media content, viewing patterns, system usage, and other data that is not particularly time dependent. The non-real-time reference data 505a may include, for example, local channel programming data, cable channel programming data, VoD data, pay-per-view data, and/or streaming media data (e.g., Netflix™, Amazon, Pandora™, etc.). In some embodiments, non-real-time reference data 505a includes all available media data, whereas real-time reference data 504a includes only media data requiring immediate identification. If the unknown media cues 502b are identified as matching known media cues associated with known media content within non-real-time reference data 505a, an identification of the matching known media content 505c may be stored in results data 507.

In some embodiments, any or all of the components illustrated in FIG. 5 may reside on client television system 501a. In some embodiments, any or all of the components illustrated in FIG. 5 may reside on a server remote from client television system 501a. In some embodiments, each component of FIG. 5 may be a separate system having separate databases and processing capabilities, for example. In some embodiments, at least some components of FIG. 5 may share databases and/or processing capabilities.

Figure 6:
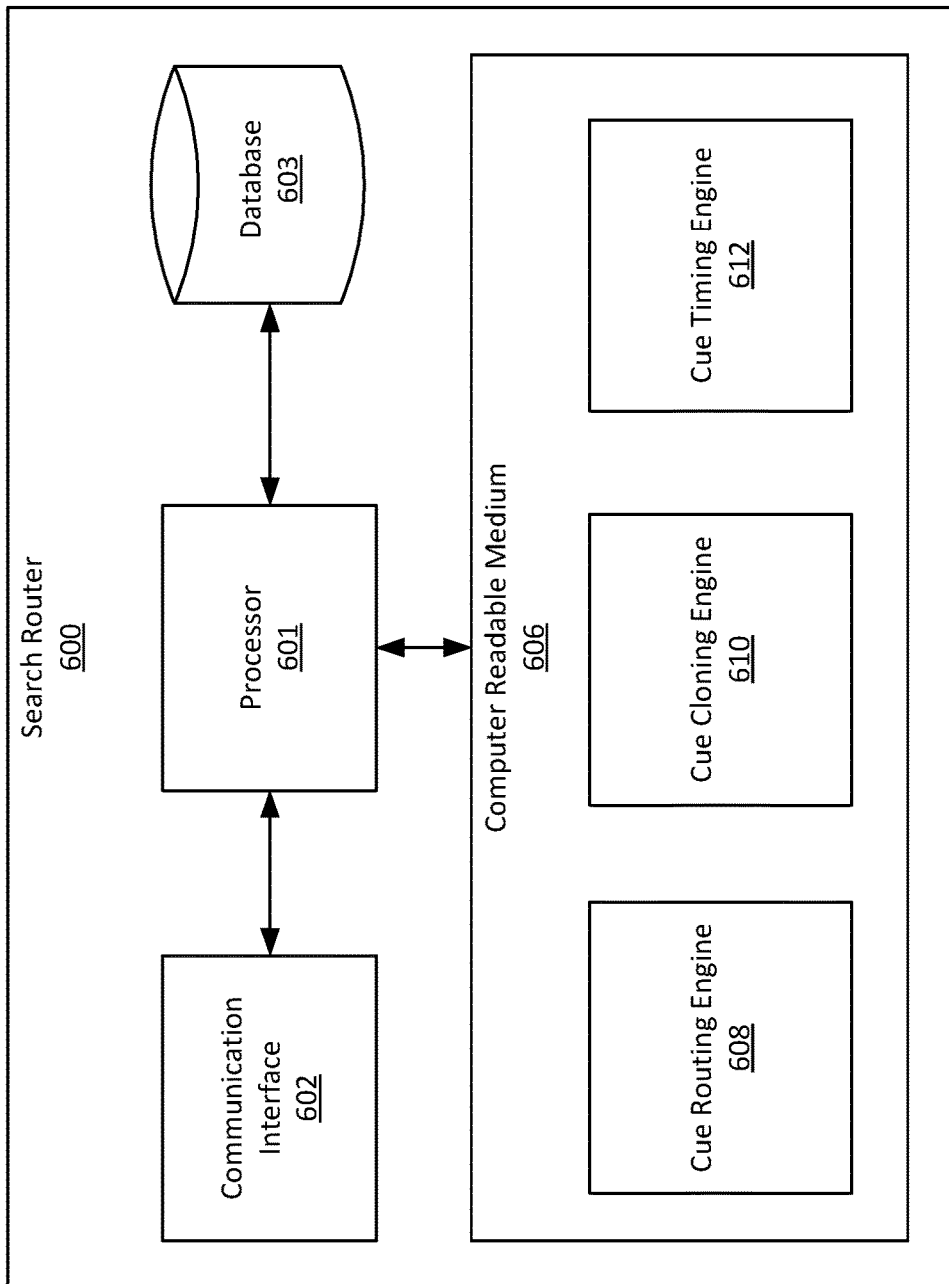
FIG. 6 is a block diagram of an example of a search router for routing cues in a media monitoring system according to embodiments of the invention.

FIG. 6 is a block diagram of an example of a search router 600 for routing cues in a media monitoring system according to embodiments of the invention. Search router 600 may be used to implement search router 503 of FIG. 5, for example. Search router 600 may include a processor 601 coupled to a communication interface 602 and a computer readable medium 606. Search router 600 may also include or otherwise have access to a database 603 that may be internal or external to search router 600. In some embodiments, database 603 may contain cue cache 506 of FIG. 5.

Processor 601 may include one or more microprocessors to execute program components for performing the functions of search router 600. Communication interface 602 can be configured to connect to one or more communication networks to allow search router 600 to communicate with other entities, such as cue manager 502a, real-time matching engine 504b, and/or non-real-time matching engine 505b of FIG. 5. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some of all of the functions of search router 600. For example, computer readable medium 606 may include code implementing a cue routing engine 608, a cue cloning engine 610, and/or a cue timing engine 612. Although shown and described as having each of these engines, it is contemplated that more or fewer engines may be implemented within computer readable medium 606. For example, a cue routing engine 608, a cue cloning engine 610, and/or a cue timing engine 612 may not be implemented in all embodiments.

Cue routing engine 608 may, in conjunction with processor 601 and communication interface 602, receive cues corresponding to unknown media content being displayed by a media system, such as directly from a media system or via a cue manager. Cue cloning engine 610, in conjunction with processor 601, may clone the received cues so as to create identical copies of the cues. Cue cloning engine 610 may then, in conjunction with processor 601, store a copy of the cues in database 603. Cue routing engine 608 may then, in conjunction with processor 601 and communication interface 602, immediately forward a copy of the cues to a real-time matching engine for real-time matching against known media content having contextually-related data, as described further herein.

Cue timing engine 612 may, in conjunction with processor 601, determine an appropriate time for which searching by a non-real-time matching engine should be completed. In some embodiments, this is in non-real-time, i.e., it is not immediate. However, it is contemplated that in some embodiments, immediate searching may be determined as desirable based on when is most convenient, efficient and/or economically advantageous. For example, if the cues corresponding to unknown media content are already received during non-prime hours when other system processing workloads are comparatively light, cue timing engine 612 may instruct cue routing engine 608 to send the cues corresponding to the unknown media content to a non-real-time matching engine immediately.

In some embodiments, cue timing engine 612 may, in conjunction with processor 601, determine that the appropriate time to send the cues to the non-real-time matching engine is at a later time, such as overnight at 2 AM. Thus, at 2 AM, cue timing engine 612 may retrieve the unknown media cues from database 603, and provide them to cue routing engine 608 for transmission to the non-real-time matching engine via communication interface 602. In some embodiments, cue timing engine 612 may, in conjunction with processor 601, send unknown media cues to the non-real-time matching engine at predetermined intervals, such as every hour, every day, etc. Thus, for example, if the unknown media cues are received at 1:13 PM, they may be stored by cue routing engine 608 until 2 PM, at which time they will be retrieved by cue timing engine 612 and provided back to cue routing engine 608 for transmission to the non-real-time matching engine.

Although shown and described in FIG. 6 as having a cue timing engine 612, it is contemplated that search router 600 may not have a cue timing engine 612 in some embodiments, and may instead immediately forward a copy of the unknown media cues to the non-real-time matching engine. In these embodiments, the non-real-time matching engine may instead comprise a cue timing engine configured to process the unknown media cues at the appropriate time.

Figure 7:
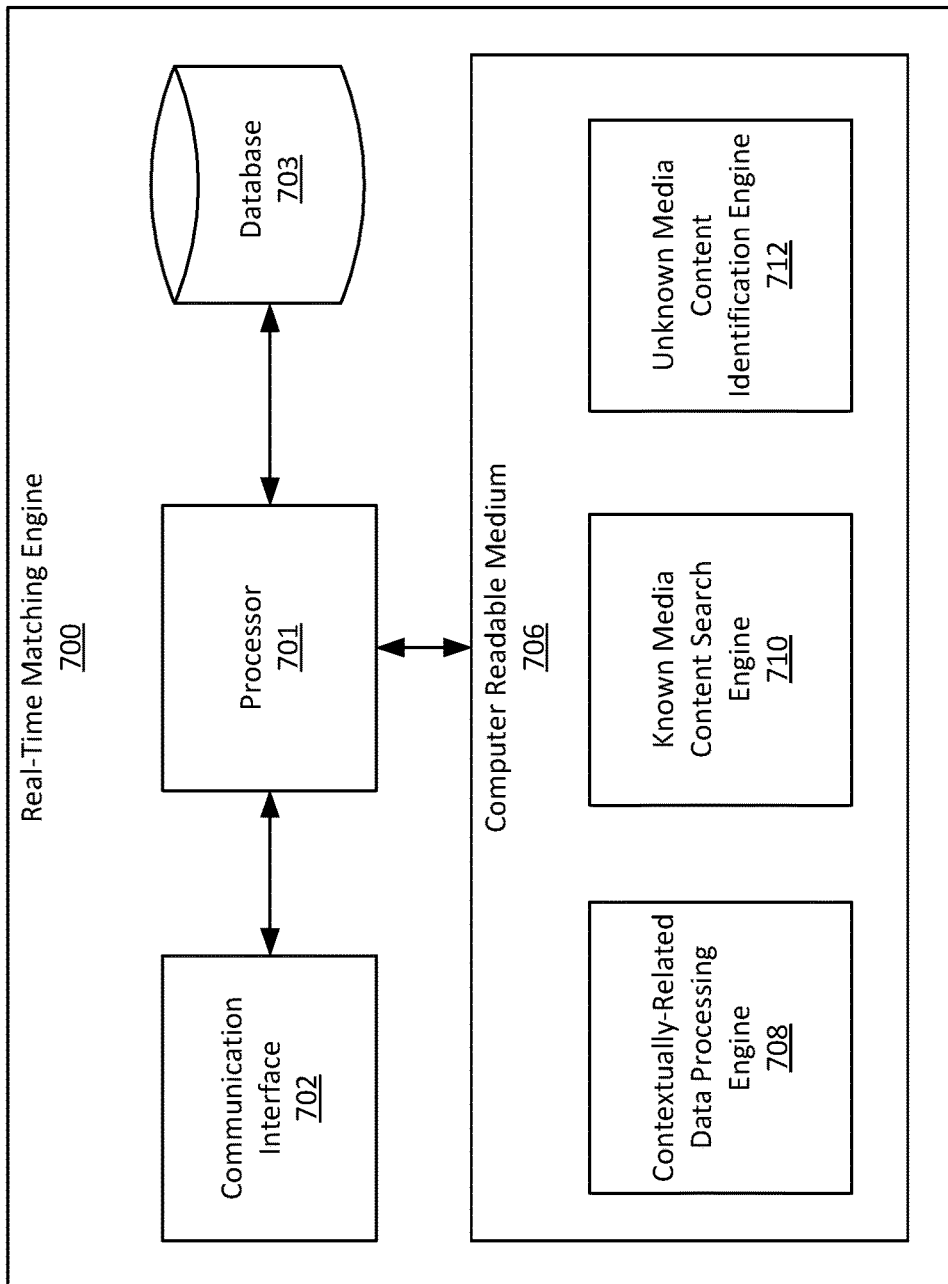
FIG. 7 is a block diagram of an example of a real-time matching engine for processing cues in real-time according to embodiments of the invention.

FIG. 7 is a block diagram of an example of a real-time matching engine 700 for processing cues in real-time according to embodiments of the invention. Real-time matching engine 700 may be used to implement real-time matching engine 504b of FIG. 5, for example. Real-time matching engine 700 may include a processor 701 coupled to a communication interface 702 and a computer readable medium 706. Real-time matching engine 700 may also include or otherwise have access to a database 703 that may be internal or external to real-time matching engine 700. In some embodiments, database 703 may comprise real-time reference data 504a of FIG. 5.

Processor 701 may include one or more microprocessors to execute program components for performing the functions of real-time matching engine 700. Communication interface 702 can be configured to connect to one or more communication networks to allow real-time matching engine 700 to communicate with other entities, such as search router 503 and/or client television system 501a of FIG. 5. Computer readable medium 706 may include any combination of one or more volatile and/or non-volatile memories, for example, RAM, DRAM, SRAM, ROM, flash, or any other suitable memory components. Computer readable medium 706 may store code executable by the processor 701 for implementing some of all of the functions of real-time matching engine 700. For example, computer readable medium 706 may include code implementing a contextually-related data processing engine 708, a known media content search engine 710, and/or an unknown media content identification engine 712. Although shown and described as having each of these engines, it is contemplated that more or fewer engines may be implemented within computer readable medium 706. For example, a contextually-related data processing engine 708, a known media content search engine 710, and/or an unknown media content identification engine 712 may not be implemented in all embodiments.

Known media content search engine 710 may, in conjunction with processor 701, receive unknown media cues from a search router. Known media content search engine 710 may then, in conjunction with processor 701, search database 703 for the unknown media cues. Database 703 may comprise known media cues associated with known media content and having corresponding contextually-related data. For example, known media content search engine 710 may compare the unknown media cues to the known media cues to determine if there is a match in the known media cues. If there is a match in the known media cues in database 703, unknown media content identification engine 712 may then, in conjunction with processor 701, identify the unknown media content as the known media content associated with the matching known media cues. In some embodiments, unknown media content identification engine 712 may also, in conjunction with processor 701, determine an offset time of the unknown media content being displayed on the client television system (e.g., a playing time, such as 12 minutes and 4 seconds from the start of the media content). The offset time may be determined, for example, by determining the offset time of the matching known media cues within the known media content. Systems and methods for identifying unknown media content and offset times are described further in the related applications incorporated by reference herein.

After the unknown media content is identified as known media content by the unknown media content identification engine 712, contextually-related data processing engine 708 may, in conjunction with processor 701, retrieve the contextually-related data associated with the matching known media content from database 703. Contextually-related data processing engine 708 may then, in conjunction with processor 701 and communication interface 702, provide the contextually-related data to a client television system for display.

Figure 8:
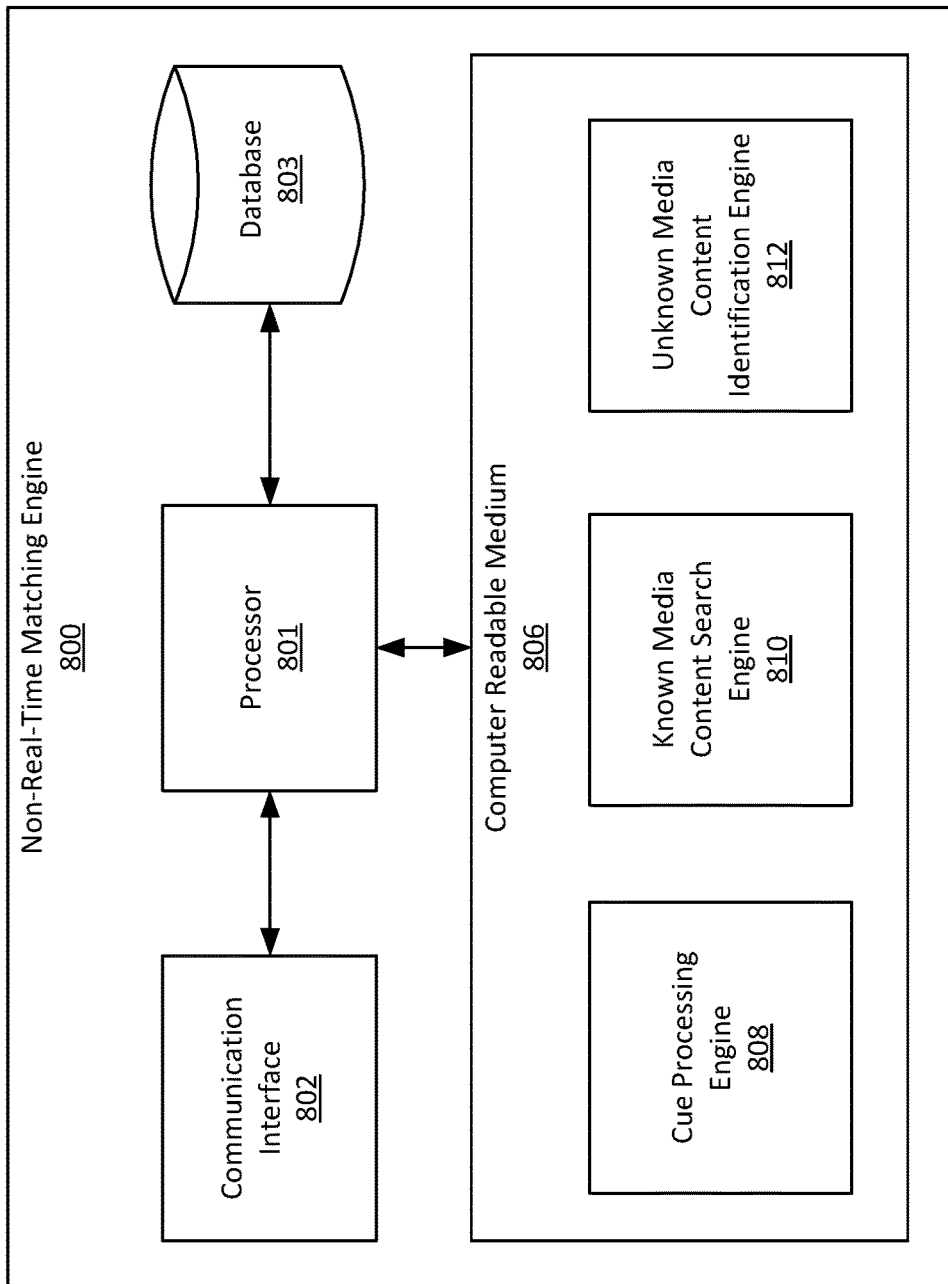
FIG. 8 is a block diagram of an example of a non-real-time matching engine for processing cues in non-real-time according to embodiments of the invention.

FIG. 8 is a block diagram of an example of a non-real-time matching engine 800 for processing cues in non-real-time according to embodiments of the invention. Non-real-time matching engine 800 may be used to implement non-real-time matching engine 505b of FIG. 5, for example. Non-real-time matching engine 800 may include a processor 801 coupled to a communication interface 802 and a computer readable medium 806. Non-real-time matching engine 800 may also include or otherwise have access to a database 803 that may be internal or external to non-real-time matching engine 800. In some embodiments, database 803 may comprise non-real-time reference data 505a of FIG. 5.

Processor 801 may include one or more microprocessors to execute program components for performing the functions of non-real-time matching engine 800. Communication interface 802 can be configured to connect to one or more communication networks to allow non-real-time matching engine 800 to communicate with other entities, such as search router 503 of FIG. 5. Computer readable medium 806 may include any combination of one or more volatile and/or non-volatile memories, for example, RAM, DRAM, SRAM, ROM, flash, or any other suitable memory components. Computer readable medium 806 may store code executable by the processor 801 for implementing some of all of the functions of non-real-time matching engine 800. For example, computer readable medium 806 may include code implementing a cue processing engine 808, a known media content search engine 810, and/or an unknown media content identification engine 812. Although shown and described as having each of these engines, it is contemplated that more or fewer engines may be implemented within computer readable medium 806. For example, a cue processing engine 808, a known media content search engine 810, and/or an unknown media content identification engine 812 may not be implemented in all embodiments.

In embodiments in which the search router does not coordinate timing of sending unknown media cues to non-real-time matching engine 800, cue processing engine 808 may, in conjunction with processor 801, receive unknown media cues from the search router immediately after receipt. Cue processing engine 808 may, in conjunction with processor 801, determine an appropriate time to forward the unknown media cues to known media content search engine 810. In some embodiments, this is in non-real-time, i.e., it is not immediate. However, it is contemplated that in some embodiments, immediate searching may be determined as desirable based on when is most convenient, efficient and/or economically advantageous. For example, if the cues corresponding to unknown media content are already received during non-prime hours when other system processing workloads are comparatively light, cue processing engine 808 may send the unknown media cutes to the known media content search engine 810 immediately.

In some embodiments, cue processing engine 808 may, in conjunction with processor 801, determine that the appropriate time to send the cues to the known media content search engine 810 is at a later time, such as overnight at 2 AM. Thus, at 2 AM, cue processing engine 808 may retrieve the unknown media cues from database 803, and provide them to known media content search engine 810. In some embodiments, cue processing engine 808 may, in conjunction with processor 801, send unknown media cues to the known media content search engine 810 at predetermined intervals, such as every hour, every day, etc. Thus, for example, if the unknown media cues are received at 1:13 PM, they may be stored in database 803 until 2 PM, at which time they will be retrieved by cue processing engine 808 and provided to known media content search engine 810 for searching.

Known media content search engine 810 may, in conjunction with processor 801, receive unknown media cues from the cue processing engine 808 at the appropriate time. Known media content search engine 810 may then, in conjunction with processor 801, search database 803 for the unknown media cues. Database 803 may comprise known media cues associated with all available known media content. For example, known media content search engine 810 may compare the unknown media cues to the known media cues to determine if there is a match in the known media cues. If there is a match in the known media cues in database 803, unknown media content identification engine 812 may then, in conjunction with processor 801, identify the unknown media content as the known media content associated with the matching known media cues. In some embodiments, unknown media content identification engine 812 may also, in conjunction with processor 801, determine an offset time of the unknown media content being displayed on the client television system (e.g., a playing time, such as 12 minutes and 4 seconds from the start of the media content). The offset time may be determined, for example, by determining the offset time of the matching known media cues within the known media content. Systems and methods for identifying unknown media content and offset times are described further in the related applications incorporated by reference herein.

Figure 9:
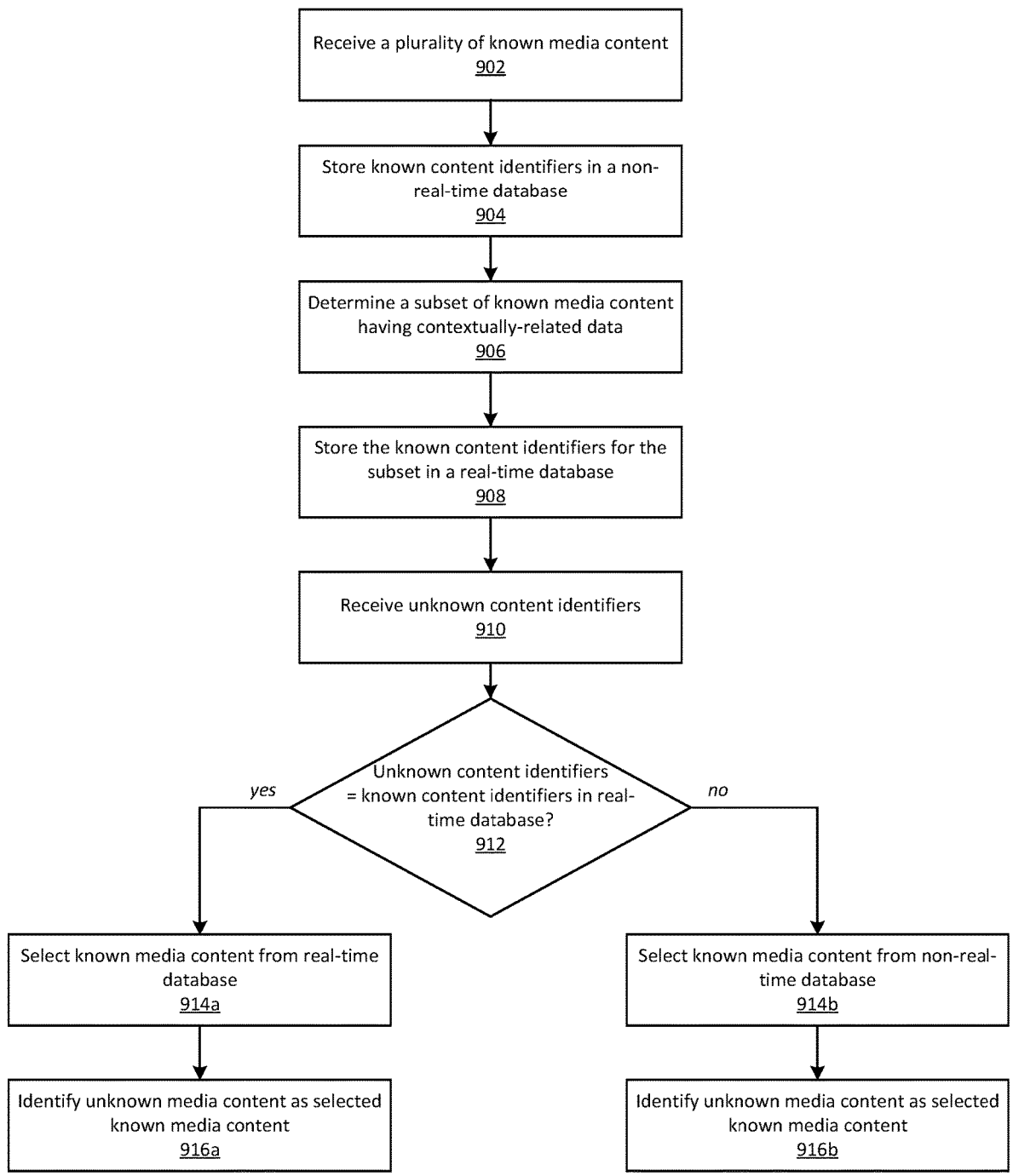
FIG. 9 is a flow chart of an example of a method for improving work load management in ACR media monitoring systems according to embodiments of the invention.

FIG. 9 is a flow chart of an example of a method for improving work load management in ACR media monitoring systems according to embodiments of the invention. At processing block 902, a plurality of known media content is received. The plurality of known media content has associated known content identifiers (also referred to herein as "cues"). The known content identifiers may comprise a sample of pixel data and/or a sample of audio data of the known media content. At processing block 904, the known content identifiers are stored in a non-real-time database.

At processing block 906, a subset of the plurality of known media content is determined that has associated contextually-related data. For example, some of the plurality of known media content may have an associated advertisement that should be displayed on television systems viewing that particular known media content. At processing block 908, the known content identifiers associated with the subset of the plurality of known media content having associated contextually-related data is stored in a real-time database. In some embodiments, it is contemplated that the steps illustrated by processing blocks 902-908 may be performed at any point prior to processing block 910, such that the non-real-time database and the real-time database are already established and ready to be searched upon receipt of unknown content identifiers. At processing block 910, unknown content identifiers corresponding to unknown media content currently being displayed by a media system are received. The unknown content identifiers may comprise a sample of pixel data and/or a sample of audio data of the unknown media content being displayed by the media system.

At decision block 912, it is determined whether the unknown content identifiers match known content identifiers associated with the subset of the plurality of known media content in the real-time database. When the unknown content identifiers match known content identifiers in the real-time database, known media content associated with the matching known content identifiers is selected from the real-time database at processing block 914a. At processing block 916a, the unknown media content is identified as the selected known media content. It is contemplated that decision block 912, processing block 914a, and processing block 916a may be performed in real-time in some embodiments. In some embodiments, the contextually-related data associated with the selected known media content is then retrieved, and may be displayed on the media system in real-time or near real-time. This step may also be performed in real-time.

When the unknown content identifiers do not match known content identifiers in the real-time database, a non-real-time database is searched for the unknown content identifiers. At processing block 914b, known media content associated with known content identifiers corresponding to the unknown content identifiers are selected from the non-real-time database. At processing block 916b, the unknown media content is identified as the selected known media content. It is contemplated that in some embodiments, processing block 914b and processing block 916b may be performed in non-real-time. In some embodiments, the identification of the unknown media content as the selected known media content may be used to generate statistics, such as how many television systems displayed a particular program. In some embodiments, this step may also be performed in non-real-time.

After processing blocks 916a and 916b, in some embodiments, an offset time associated with the unknown media content may be determined using the unknown content identifiers and the known content identifiers. For example, the offset time of the matching known content identifiers within the known media content can be determined as the offset time of the unknown content identifiers within the unknown media content.

The process described with respect to FIG. 9 is not intended to be limiting. For example, although described as only being searched when the unknown content identifiers are not matched in the real-time database, it is contemplated that the non-real-time database may be searched in addition to the real-time database even when a match is found, for example, to confirm the correct match against a larger database of reference data. In addition, the process illustrated by the flowchart of FIG. 9 may be implemented by the media system, by a server located remotely from the media system, by both, or partially by component(s) located at the media system and partially by component(s) located at a remote server.

The nearest neighbor and path pursuit techniques mentioned previously are now described in detail. An example of tracking video transmission using ambiguous cues is given, but the general concept can be applied to any field, such as those described above.

A method for efficient video pursuit is presented. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments and switching to unknown segments. Before being able to pursue live video the database is processed. Visual cues (a handful of pixel values) are taken from frames every constant fraction of a second and put in specialized data structure (Note that this can also be done in real time). The video pursuit is performed by continuously receiving cues from the input video and updating a set of beliefs or estimates about its current location. Each cue either agrees or disagrees with the estimates, and they are adjusted to reflect the new evidence. A video location is assumed to be the correct one if the confidence in this being true is high enough. By tracking only a small set of possible "suspect" locations, this can be done efficiently.

A method is described for video pursuit but uses mathematical constructs to explain and investigate it. It is the aim of this introduction to give the reader the necessary tools to translate between the two domains. A video signal is comprised of sequential frames. Each can be thought of as a still image. Every frame is a raster of pixels. Each pixel is made out of three intensity values corresponding to the red, green and blue (RGB) make of that pixel's color. In the terminology of this manuscript, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as "moving" a little between frames. Following these tiny movements from frame to frame, the cue follows a path in space like a bead would on a bent wire.

Figure 10:
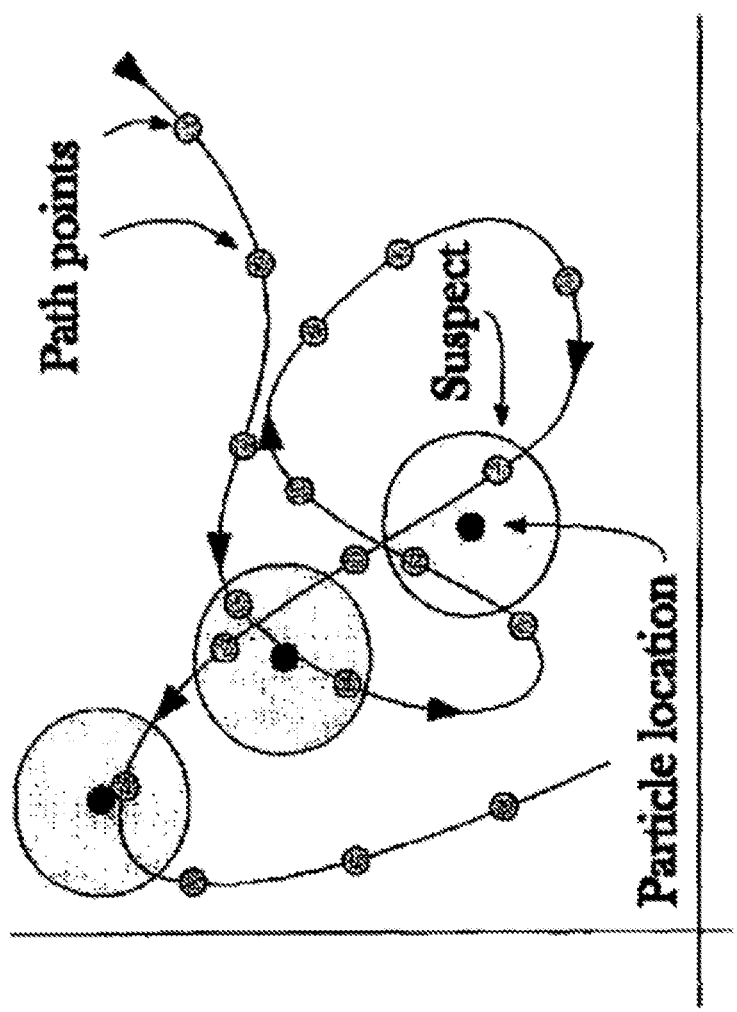
FIG. 10 is a chart illustrating point locations and the path points around them according to embodiments of the invention.

In the language of this analogy, in video pursuit the locations of the bead in space (the cue points) are received and the part of wire (path) the bead is following is looked for. This is made significantly harder by two facts. First, the bead does not follow the wire exactly but rather keeps some varying unknown distance from it. Second the wires are all tangled together. These statements are made exact in section 2. The algorithm described below does this in two conceptual steps. When a cue is received, it looks for all points on all the known paths that are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations that are sufficiently unlikely. This history update process ensures that on the one hand only a small history is kept but on the other hand no probable locations are ever deleted. The generic algorithm is given in Algorithm 1 and illustrated in FIG. 10.

---
Algorithm 1 Generic path pursuit algorithm.
---
1: Set of suspects is empty
2: loop
3:    Receive latest cue.
4:    Find path points who are close to it.
5:    Add them to the set of suspects.
6:    Based on the suspects update the location likelihood function.
7:    Remove from suspect set those who do not contribute to the likelihood function.
8:    if A location is significantly likely then
9:       Output the likely location.
10:    end if
11: end loop

---

The document begins with describing the Probabilistic Point Location in Equal Balls (PPLEB) algorithm in Section 1. It is used in order to perform line 5 in Algorithm 1 efficiently. The ability to perform this search for suspects quickly is crucial for the applicability of this method. Later, in section 2 one possible statistical model is described for performing lines 6 and 7. The described model is a natural choice for the setup. It is also shown how it can be used very efficiently.

Section 1

Probabilistic Point Location in Equal Balls

The following section describes a simple algorithm for performing probabilistic point location in equal balls (PPLEB). In the traditional PLEB (point location in equal balls), one starts with a set of n points x, in 1R d and a specified ball of radius r. The algorithm is given O(poly(n)) preprocessing time to produce an efficient data structure. Then, given a query point x the algorithm is required to return all points x, such that $\|x-x_i\| \le r$. The set of points such that $\|x-x_i\| \le r$. geometrically lie within a ball of radius r surrounding the query x (see FIG. 11). This relation is referred to as x, being close to x or as x, and x being neighbors.

The problem of PPLEB and the problem of nearest neighbor search are two similar problems that received much attention in the academic community. In fact, these problems were among the first studied in the field of computational geometry. Many different methods cater to the case where the ambient dimension d is small or constant. These partition the space in different ways and recursively search through the parts. These methods include KD-trees, cover-trees, and others. Although very efficient in low dimension, when the ambient dimension is high, they tend to perform very poorly. This is known as the "curse of dimensionality". Various approaches attempt to solve this problem while overcoming the curse of dimensionality. The algorithm used herein uses a simpler and faster version of the algorithm and can rely on Local Sensitive Hashing.

Section 1.1

Locality Sensitive Hashing

In the scheme of local sensitive hashing, one devises a family of hash functions H such that:

$$\Pr_{u \sim U}(u(x) \ne u(y) \mid \|x - y\| \le r) \equiv P$$

$$\Pr_{u \sim U}(u(x) \ne u(y) \mid \|x - y\| \ge 2r) \ge 2p$$

In words, the probability of x and y being mapped to the same value by h is significantly higher if they are close to each other.

For the sake of clarity, let us first deal with a simplified scenario where all incoming vectors are of the same length r' and $r' > \sqrt{2r}$. The reason for the latter condition will become clear later. First a random function $u \in U$ is defined, which separates between x and y according to the angle between them. Let u be a random vector chosen uniformly from the unit sphere $S^{d-i}$ and let $u(x)=\text{sign}(\vec{u} \cdot x)$. It is easy to verify that $P_{u \sim U}(u(x) \ne u(y)) = 0_{x,y}/\pi$. Moreover, for any points x, y, x', y' on a circle such that $\|x'-y'\| \sim \le 2\|x-y\|$, $0_{x',y'} \le 20_{x,y}$ is achieved. Defining p, the following equations are used:

$$\Pr_{u \sim U}(u(x) \ne u(y) \mid \|x - y\| \le r) \equiv P$$

$$\Pr_{u \sim U}(u(x) \ne u(y) \mid \|x - y\| \ge 2r) \ge 2p$$

The family of functions H is set to be a cross product of t independent copies of u, i.e. $h(x)=[u_1(x), \ldots, u_t(x)]$. Intuitively, one would like to have that if h(x)=h(y) then x and y are likely to be close to each other. Let us quantify that. First, compute the expected number of false positive mistakes $n_{fp}$. These are the cases for which h(x)=h(y) but $\|x-y\|>2r$. A value t is found for which $n_{fp}$ is no more than 1, i.e. one is not expected to be wrong.

$$E[n_{fp}] \le n(1-2)^t \le 1 \to t \ge \log(1/n)/\log(1-2p)$$

Now, the probability that h(x)=h(y) given that they are neighbors is computed:

$$Pr(h(x) = h(y) \mid \|x - y\| \le r) \ge (1 - p)^{\log(1/n)/\log(1-2p)}$$
$$= (1/n)^{\log(1-p)/\log(1-2p)} \ge 1\sqrt{n}.$$

Note here that one must have that 2p<1 which requires $r' > \sqrt{2r}$ This might not sound like a very high success probability. Indeed, $1\sqrt{n}$ is significantly smaller than ½. The next section will describe how to boost this probability up to ½.

Section 1.2

The Point Search Algorithm

Each function h maps every point in space to a bucket. Define the bucket function $B_h : \mathbb{R}^i \to 2^{[n]}$ of a point x with respect to hash function h as $B_h(x) \equiv \{x_i \mid h(x_i)=h(x)\}$. The data structure maintained is $m=O(\sqrt{n})$ instances of bucket functions $[Bh_1, \ldots, Bh_m]$. When one searches for a point x, the function returns $B(x)=\cup_i B_{h_i}(x)$. According to the previous section, there are two desired results:

$$Pr(x_i \in B(x) \mid \|x_i - x\| \le r) \ge \frac{1}{2} [|B(x) \cap \{x_i \mid \|x - x_i\| > 2r\}|] \le \sqrt{n}.$$

In other words, while with probability at least ½ each neighbor of x is found, one is not likely to find many non-neighbors.

Section 1.3

Dealing with Different Radii Input Vectors

Figure 11:
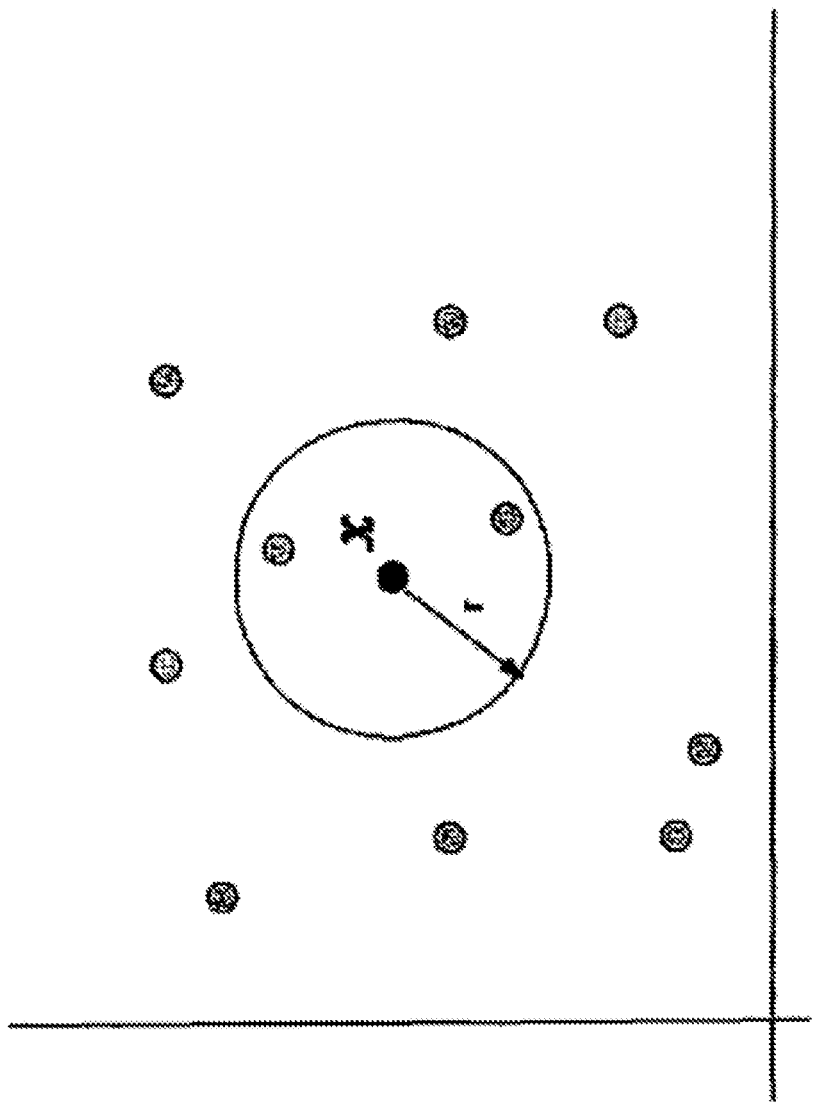
FIG. 11 is a chart illustrating a set of points that lie within a distance from a query point according to embodiments of the invention.

The previous sections only dealt with searching through vectors of the same length, namely r'. Now described is how one can use the construction as a building block to support a search in different radii. As seen in FIG. 11, the space is divided into rings of exponentially growing width. Ring i, denoted by $R_i$, includes all points xi such that $\|x_i\| \in [2r(1+\epsilon)^i, 2r(1+\epsilon)^{i+1}]$. Doing this achieves two ends. First, if xi and xj belong to the same ring, then $\|x_j\|/(1+\epsilon) \leq \|x_i\| \leq \|x_j\|(1+\epsilon)$. Second, any search can be performed in at most 1/c such rings. Moreover, if the maximal length vector in the data set is r' then the total number of rings in the system is O(log (r'/r)).

Section 2

The Path Pursuit Problem

In the path pursuit problem, a fixed path in space is given along with the positions of a particle in a sequence of time points. The terms particle, cue, and point will be used interchangeably. The algorithm is required to output the position of the particle on the path. This is made harder by a few factors: the particle only follows the path approximately; the path can be discontinuous and intersect itself many times; both particle and path positions are given in a sequence of time points (different for each).

It is important to note that this problem can simulate tracking a particle on any number of paths. This is simply done by concatenating the paths into one long path and interpreting the resulting position as the position on the individual paths.

Figure 12:
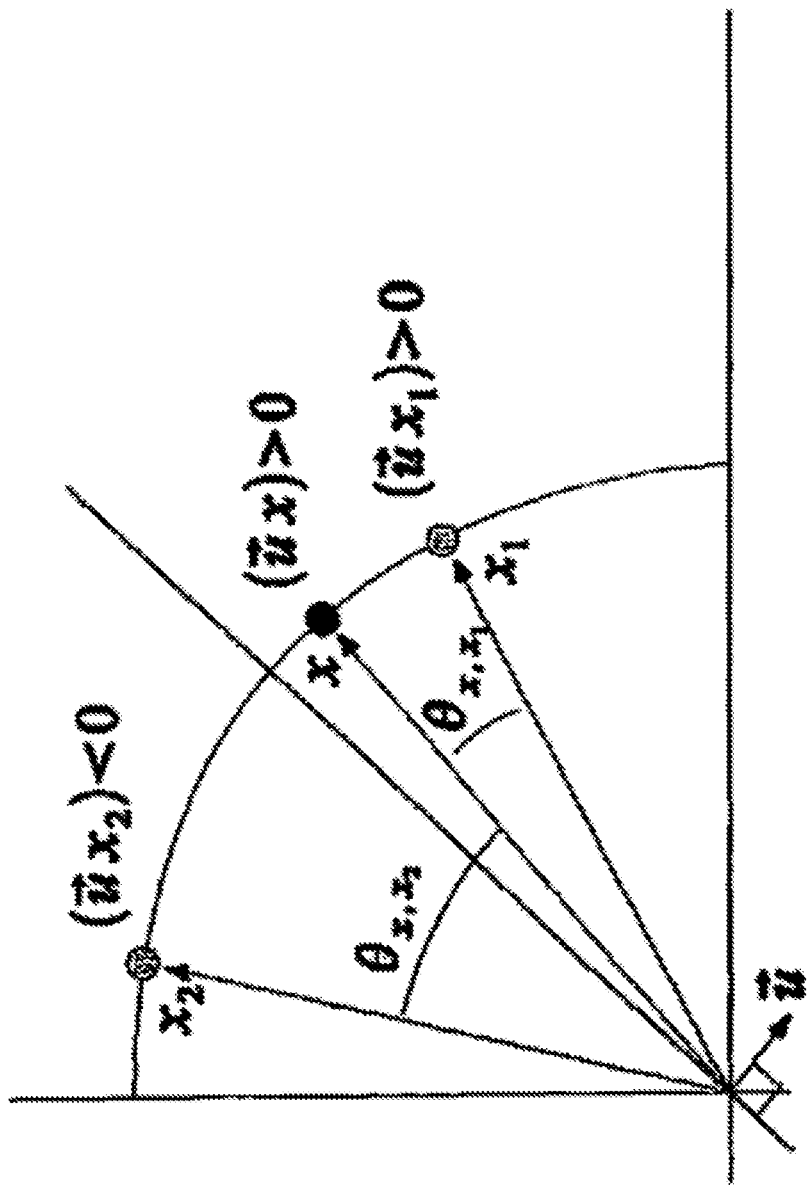
FIG. 12 is a chart illustrating possible point values according to embodiments of the invention.

More precisely, let path P be parametric curve $P: \mathbb{R} \to \mathbb{R}^d$. The curve parameter will be referred to as the time. The points on the path that are known to us are given in arbitrary time points i.e. n pairs $(t_i, P(t_i))$ are given. The particle follows the path but its positions are given in different time points, as shown in FIG. 12. Further, m pairs $(t'_j, x(t'_j))$ are given, where $x(t'_j)$ is the position of the particle in time $t'_j$.

Section 2.1

Likelihood Estimation

Since the particle does not follow the path exactly and since the path can intersect itself many times it is usually impossible to positively identify the position on the path the particle is actually on. Therefore, a probability distribution is computed on all possible path locations. If a location probability is significantly probable, the particle position is assumed to be known. The following section describes how this can be done efficiently.

If the particle is following the path, then the time difference between the particle time stamp and the offset of the corresponding points on P should be relatively fixed. In other words, if x(t') is currently in offset t on the path then it should be close to P(t). Also, $\tau$ seconds ago it should have been in offset t−$\tau$. Thus x(t'−$\tau$) should be close to P(t−$\tau$) (note that if the particle is intersecting the path, and x(t') is close to P(t) temporarily, it is unlikely that x(t'−$\tau$) and P(t−$\tau$) will also be close). Define the relative offset as $\Delta = t - t'$.

Notice that as long as the particle is following the path the relative offset $\Delta$ remains unchanged. Namely, x(t') is close to P(t'+$\Delta$).

The maximum likelihood relative offset is obtained by calculating:

$$\Delta = \underset{\delta}{\operatorname{argmax}} Pr(x(t'_m), x(t'_{m-1}), \ldots, x(t'_1)|P, \delta)$$

In words, the most likely relative offset is the one for which the history of the particle is most likely. This equation however cannot be solved without a statistical model. This model must quantify: How tightly x follows the path; How likely it is that x '(umps" between locations; How smooth the path and particle curves are between the measured points.

Section 2.2

Time Discounted Binning

Now described is a statistical model for estimating the likelihood function. The model makes the assumption that the particle's deviation away from the path distributes normally with standard deviation ar. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit 1, set the likelihood function to be proportional to $f$ which is defined as follows:

$$f_m(\lfloor \delta/\tau \rfloor) = \sum_{j=1}^{m} \sum_{i=1}^{n} e^{-\left(\frac{[\|x(t'_j)-P(t_i+\delta)\|]}{\sigma r}\right)^2} (1-\zeta)^{t'_i-t'_j}.$$

Here $\alpha \ll 1$ is a scale coefficient and $\zeta 0$ is the probability that the particle will jump to a random location on the path in a given time unit.

Updating the function $f$ efficiently can be achieved using the following simple observation.

$$f_m(\lfloor \delta/\tau \rfloor) = \sum_{i=1}^{n} e^{-\left(\frac{[\|x(t'_j)-P(t_i+\delta)\|]}{\sigma r}\right)^2} + f_{m-1}(\lfloor \delta/\tau \rfloor)(1-\zeta)^{t'_m-t'_{m-1}}$$

Moreover, since $\alpha \ll 1$, if $\|x(t'_m) - P(t_i)\| \geq r$, the follow occurs:

$$e^{-\left(\frac{[\|x(t'_m)-P(t_i)\|]}{\sigma r}\right)^2} \approx 0.$$

This is an important property of the likelihood function since the sum update can now performed only over the neighbors of $x(t_j^i)$ and not the entire path. Denote by S the set of $(t_i, P(t_i))$ such that $\|x(t'_m) - P(t_i)\| \leq r$. The follow equation occurs:

$$f_m(\lfloor \delta/\tau \rfloor) = \sum_{(t_j, P(t_j)) \in S \wedge \lfloor t'_m - t_j/\tau \rfloor = \lfloor \delta/\tau \rfloor} e^{-\left(\frac{[[x(t'_m)-P(t_j)]]}{\sigma r}\right)^2} + f_{m-1}(\delta)(1-\zeta)^{t'_m t'_{m-1}}$$

This is described in Algorithm 2.2 below. The term $f$ is used as a sparse vector that receives also negative integer indices. The set S is the set of all neighbors of $x(t_i)$ on the path and can be computed quickly using the PPLEB algorithm. It is easy to verify that if the number of neighbors of $x(t_1)$ is bounded by some constant $n_{near}$ then the number of non-zeros in the vector $f$ is bounded by $n_{near}/\zeta$ which is only a constant factor larger. The final stage of the algorithm is to output a specific value of $\delta$ is $ff(\lfloor \delta/\tau \rfloor)$ is above some threshold value.

| Algorithm 2 Efficient likelihood update. |
| --- |
| 1:     f ← 0 |
| 2:     while (t$_j$', x(t$_j$')) ∈ INPUT do |
| 3:        f ← (1 − ⓩ) ⓩ f |
| 4:        S ← {(t$_i$, P(t ⓩ)) \| \| ⓩ x(t$_j$') − P(t ⓩ) ⓩ \|≤r} |
| 5:        for (t$_i$, P(t$_i$)) ∈ S do |
| 6:           δ ← t$_j$' − t$_i$ |
| 7:           f(⌊δ/τ⌋) ← f(⌊δ/τ⌋) +ⓩ |
| 8:        end for |
| 9:        Set all f values below threshold ϵ to zero. |
| 10:    end while |

ⓩ indicates text missing or illegible when filed

FIG. 11 gives three consecutive point locations and the path points around them. Note that neither the bottom point nor middle one alone would have been sufficient to identify the correct part of the path. Together, however, they are. Adding the top point increases the certainty that the particle is indeed of the final (left) curve of the path.

In FIG. 12, given a set of n (grey) points, the algorithm is given a query point (black) and returns the set of points that lie within distance r from it (the points inside the circle). In the traditional setting, the algorithm must return all such points. In the probabilistic setting each such point should be returned only with some constant probability.

Figure 13:
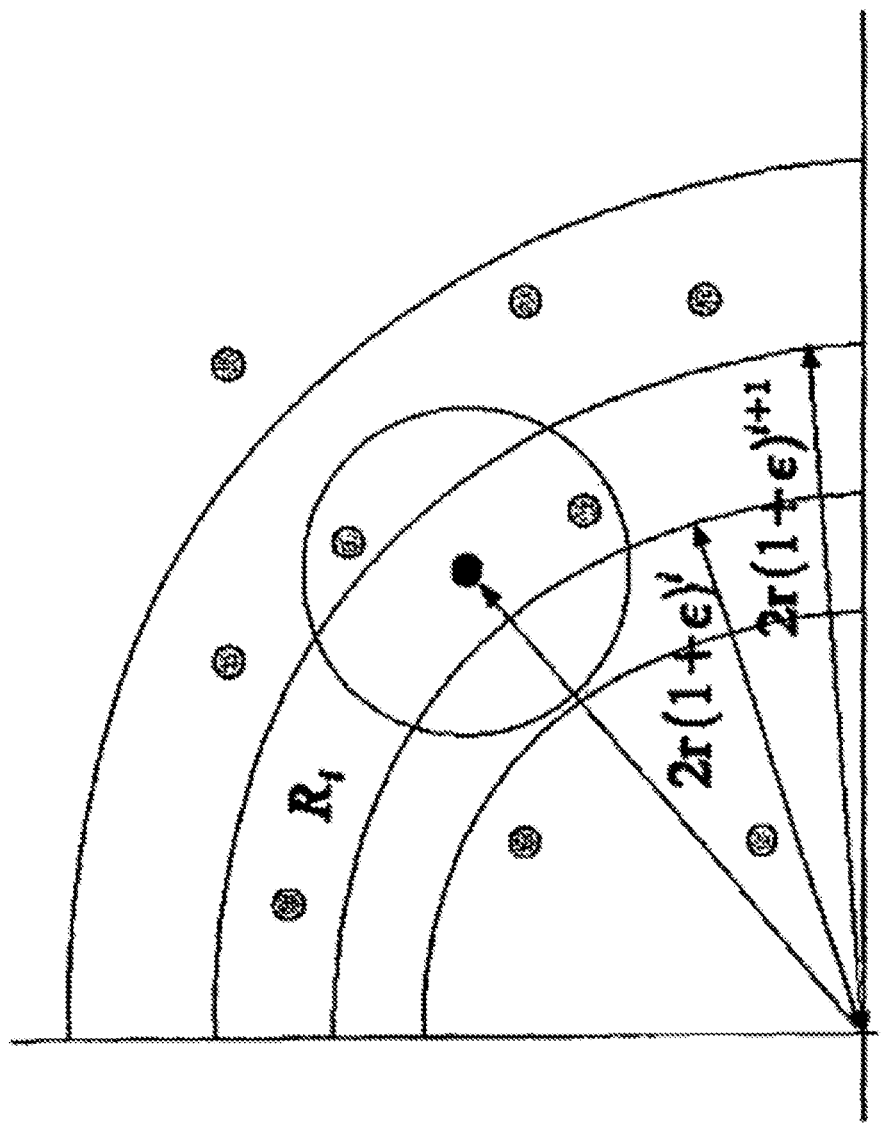
FIG. 13 is a chart illustrating a space divided into rings of exponentially growing width according to embodiments of the invention.

FIG. 13 illustrates the values of $u(x_1)$, $u(x_2)$, and $u(x)$. Intuitively, the function u gives different values to $x_1$ and $x_2$ if the dashed line passes between them and the same value otherwise. Passing the dashed line in a random direction ensures that the probability of this happening is directly proportional to angle between $x_1$ and $x_2$.

Figure 14:
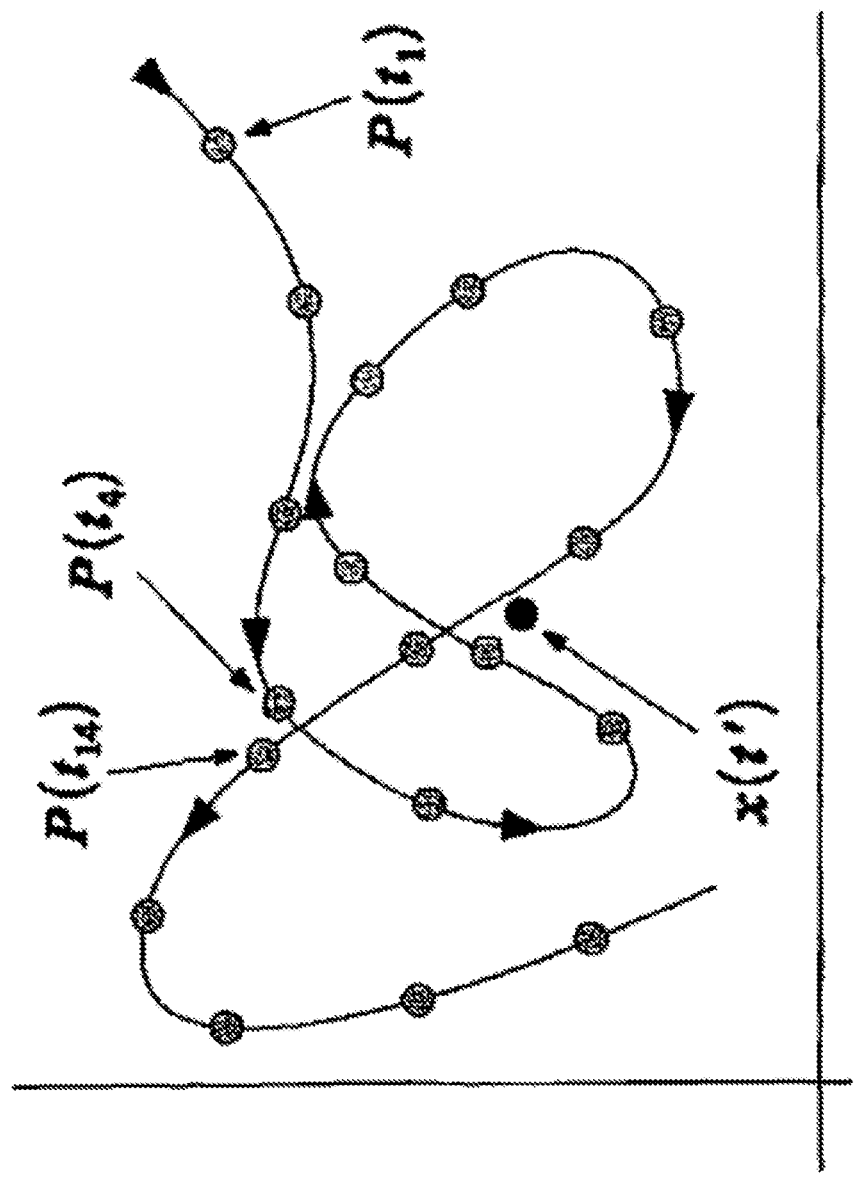
FIG. 14 is a chart illustrating self-intersecting paths and a query point according to embodiments of the invention.

FIG. 14 shows that by dividing the space into rings such that ring $R_i$ is between radius $2r(1+\epsilon)^i$ and $2r(1+\epsilon)^{i+1}$, it can be made sure that any two vectors within a ring are the same length up to $(1+\epsilon)$ factors and that any search is performed in at most $1/\epsilon$ rings.

Figure 15:
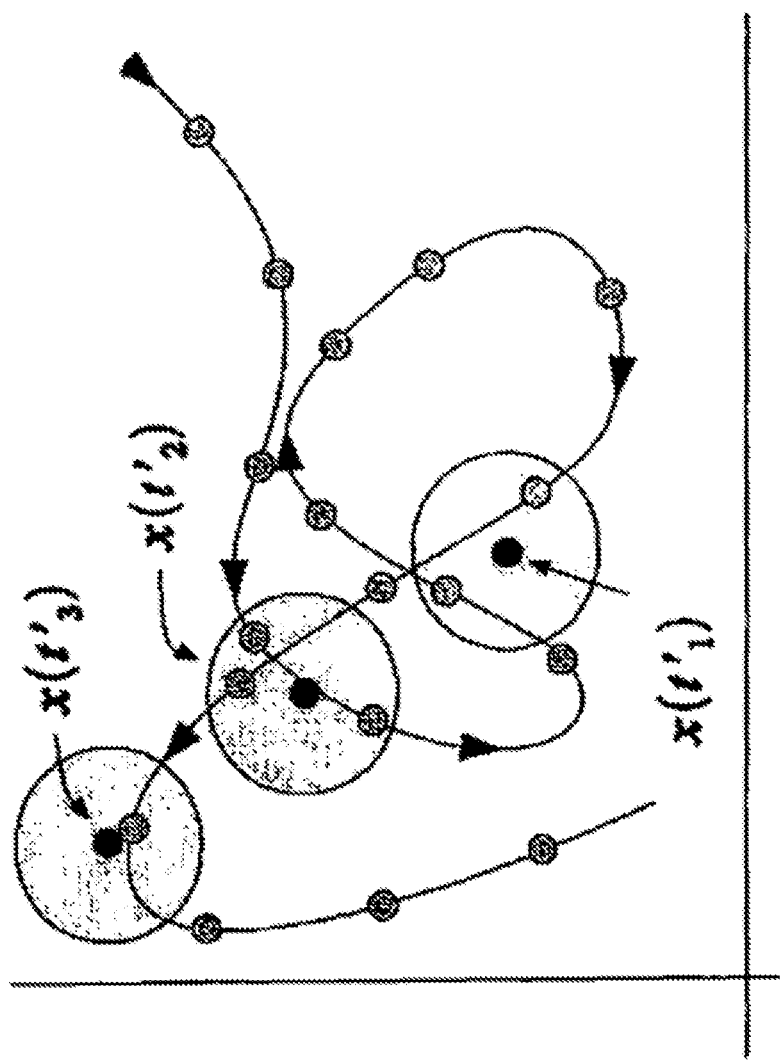
FIG. 15 is a chart illustrating three consecutive point locations and the path points around them according to embodiments of the invention.

FIG. 15 shows a self-intersecting paths and a query point (in black). It illustrates that without the history of the particle positions it is impossible to know where it is on the path.

FIG. 15 gives three consecutive point locations and the path points around them. Note that neither $x(t_1)$ nor $x(t_2)$ alone would have been sufficient to identify the correct part of the path. Together however they are. Adding $x(t_3)$ increases the certainty that the particle is indeed of the final (left) curve of the path.

Although described substantially herein as relating to video data and graphical displays, it is contemplated that the systems and methods described herein may be similarly used with respect to audio data and audible displays.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A media system comprising:
   one or more processors; and
   a non-transitory machine-readable storage media containing instructions which when executed by the one or more processors, cause the one or more processors to perform operations including:
   receiving a set of content identifiers associated with known media content;
   identifying a subset of the known media content that is associated with contextually-related data;
   storing, in a real-time database, content identifiers corresponding to the subset of the known media content;
   deriving one or more unknown content identifiers from unknown media content being displayed by the media system;

searching the real-time database using the one or more unknown content identifiers;

selecting known media content from the real-time database in response to identifying a particular content identifier associated with the known media content matching an unknown content identifier of the one or more unknown content identifiers;

identifying alternative media content associated with the known media content, wherein the alternative media content is associated with the contextually-related data of the known media content; and substituting, in real-time, the unknown media content with the alternative media content.

2. The media system of claim 1, wherein the operations further comprise:

searching a non-real-time database using the one or more unknown content identifiers; and selecting the known media content from the non-real-time database in response to identifying the particular content identifier associated with the known media content matching the unknown content identifier of the one or more unknown content identifiers.

3. The media system of claim 1, wherein the operations further comprise:

deriving additional unknown content identifiers corresponding to additional unknown media content being displayed by a media system;

searching the real-time database using the additional unknown content identifiers; and searching a non-real-time database using the additional unknown content identifiers in response to determining that the additional unknown content identifiers do not correspond to known content identifiers of the real-time database.

4. The media system of claim 3, wherein identifying additional known media content that corresponds to the additional unknown media content by searching the non-real-time database generates statistics associated with the additional known media content.

5. The media system of claim 1, wherein the real-time database stores content identifiers associated with known media content that is associated with contextually-related data.

6. The media system of claim 1, wherein facilitating substitution of the unknown media content using the contextually-related data associated with the known media content comprises:

retrieving the contextually-related data associated with the selected known media content; and displaying the contextually-related data, wherein the contextually-related data is retrieved and displayed in real time.

7. A method comprising:

receiving a set of content identifiers associated with known media content;

identifying a subset of the known media content that is associated with contextually-related data;

storing, in a real-time database, content identifiers corresponding to the subset of the known media content;

deriving one or more unknown content identifiers from unknown media content being displayed by a media system;

searching the real-time database using the one or more unknown content identifiers;

selecting known media content from the real-time database in response to identifying a particular content identifier associated with the known media content matching an unknown content identifier of the one or more unknown content identifiers;

identifying alternative media content associated with the known media content, wherein the alternative media content is associated with the contextually-related data of the known media content; and substituting, in real-time, the unknown media content with the alternative media content.

8. The method of claim 7, further comprising:

searching a non-real-time database using the one or more unknown content identifiers; and selecting the known media content from the non-real-time database in response to identifying the particular content identifier associated with the known media content matching the unknown content identifier of the one or more unknown content identifiers.

9. The method of claim 7, further comprising:

deriving additional unknown content identifiers corresponding to additional unknown media content being displayed by a media system;

searching the real-time database using the additional unknown content identifiers; and searching a non-real-time database using the additional unknown content identifiers in response to determining that the additional unknown content identifiers do not correspond to known content identifiers of the real-time database.

10. The method of claim 9, wherein identifying additional known media content that corresponds to the additional unknown media content by searching the non-real-time database generates statistics associated with the additional known media content.

11. The method of claim 7, wherein the real-time database stores content identifiers associated with known media content that is associated with contextually-related data.

12. The method of claim 7, wherein facilitating substitution of the unknown media content using the contextually-related data associated with the known media content comprises:

retrieving the contextually-related data associated with the selected known media content; and displaying the contextually-related data, wherein the contextually-related data is retrieved and displayed in real time.

13. A non-transitory machine-readable storage media containing instructions which when executed by one or more processors of a media system, cause the one or more processors to perform operations including:

receiving a set of content identifiers associated with known media content;

identifying a subset of the known media content that is associated with contextually-related data;

storing, in a real-time database, content identifiers corresponding to the subset of the known media content;

deriving one or more unknown content identifiers from unknown media content being displayed by the media system;

searching the real-time database using the one or more unknown content identifiers;

selecting known media content from the real-time database in response to identifying a particular content identifier associated with the known media content matching an unknown content identifier of the one or more unknown content identifiers;

identifying alternative media content associated with the known media content, wherein the alternative media content is associated with the contextually-related data of the known media content; and substituting, in real-time, the unknown media content with the alternative media content.

14. The non-transitory machine-readable storage media of claim 13, wherein the operations further comprise:

searching a non-real-time database using the one or more unknown content identifiers; and selecting the known media content from the non-real-time database in response to identifying the particular content identifier associated with the known media content matching the unknown content identifier of the one or more unknown content identifiers.

15. The non-transitory machine-readable storage media of claim 13, wherein the operations further comprise:

deriving additional unknown content identifiers corresponding to additional unknown media content being displayed by a media system;

searching the real-time database using the additional unknown content identifiers; and searching a non-real-time database using the additional unknown content identifiers in response to determining that the additional unknown content identifiers do not correspond to known content identifiers of the real-time database.

16. The non-transitory machine-readable storage media of claim 13, wherein the real-time database stores content identifiers associated with known media content that is associated with contextually-related data.

17. The non-transitory machine-readable storage media of claim 13, wherein facilitating substitution of the unknown media content using the contextually-related data associated with the known media content comprises:

retrieving the contextually-related data associated with the selected known media content; and displaying the contextually-related data, wherein the contextually-related data is retrieved and displayed in real time.

* * * * *